United States Patent
Tsuchiya et al.

(10) Patent No.: US 8,504,122 B2
(45) Date of Patent: Aug. 6, 2013

(54) COMMUNICATION TERMINAL APPARATUS, POWER SUPPLY CONTROL METHOD, AND NON-TRANSITORY COMPUTER READABLE RECORDING MEDIUM STORING POWER SUPPLY CONTROL PROGRAM

(75) Inventors: Rei Tsuchiya, Chiba (JP); Yukio Takayashiki, Kawasaki (JP); Fumiyoshi Tomohara, Kawasaki (JP); Manabu Toyoda, Kawasaki (JP); Hideto Ito, Kawasaki (JP); Katsuaki Akama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 104 days.

(21) Appl. No.: 12/938,983

(22) Filed: Nov. 3, 2010

(65) Prior Publication Data
US 2011/0105199 A1    May 5, 2011

(30) Foreign Application Priority Data

Nov. 4, 2009    (JP) .................................. 2009-253512

(51) Int. Cl.
| | |
|---|---|
| H04M 1/00 | (2006.01) |
| H04B 1/38 | (2006.01) |
| H04B 1/16 | (2006.01) |
| G09G 5/00 | (2006.01) |
| G06F 1/00 | (2006.01) |
| G06F 1/32 | (2006.01) |

(52) U.S. Cl.
USPC ..... 455/574; 455/572; 455/343.1; 455/343.2; 455/557; 345/1.1; 345/1.3; 713/300; 713/320; 713/323

(58) Field of Classification Search
USPC ..... 455/572–574, 575.1–575.4, 343.1–343.2, 455/343.5; 345/1.1–6, 156; 713/300–340
See application file for complete search history.

(56) References Cited

U.S. PATENT DOCUMENTS

2004/0229648 A1* 11/2004 Yamamoto et al. .......... 455/557
2008/0025279 A1*  1/2008 Young et al. ................. 370/341

FOREIGN PATENT DOCUMENTS

| JP | 2002-290320 |   | 10/2002 |
|----|-------------|---|---------|
| JP | 2003-209889 | A | 7/2003 |
| JP | 2004-172826 | A | 6/2004 |
| JP | 2004172826  | A * | 6/2004 |
| JP | 2005-184501 | A | 7/2005 |
| JP | 2005-286376 | A | 10/2005 |

OTHER PUBLICATIONS

JP Office Action mailed on Dec. 4, 2012 in application No. 2009-253512.

* cited by examiner

*Primary Examiner* — Jean Gelin
*Assistant Examiner* — Dung Hong
(74) *Attorney, Agent, or Firm* — Maschoff Brennan

(57) ABSTRACT

A communication terminal apparatus (separate type portable telephone) separated into a first communication apparatus (parent device) and a second communication apparatus (child device), the first communication apparatus and the second communication apparatus in a separated state being wirelessly connected through direct communication. The communication terminal apparatus includes a joining detecting unit and a power supply control unit. The joining detecting unit detects joining between the first communication apparatus and the second communication apparatus. The power supply control unit performs control for conforming a power control state of the second communication apparatus to a power control state of the first communication apparatus if the first communication apparatus and the second communication apparatus are joined while the power control states are different between the first communication apparatus and the second communication apparatus.

3 Claims, 30 Drawing Sheets

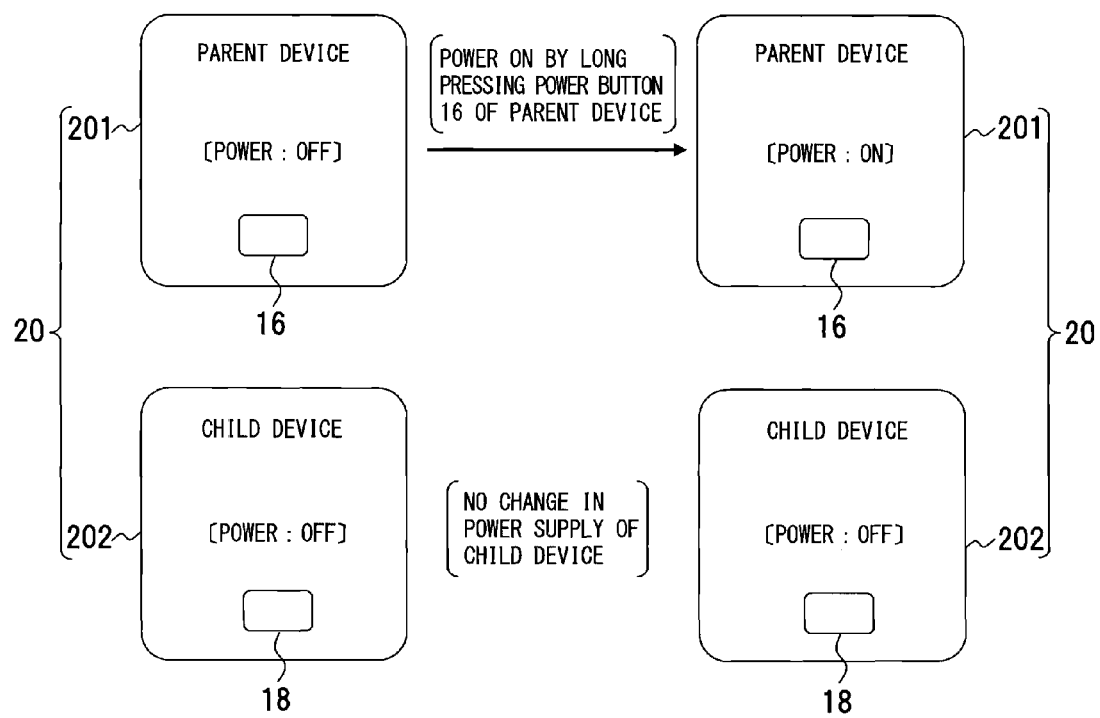

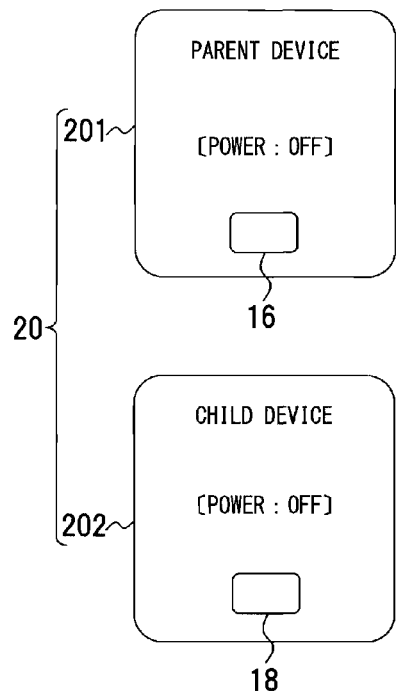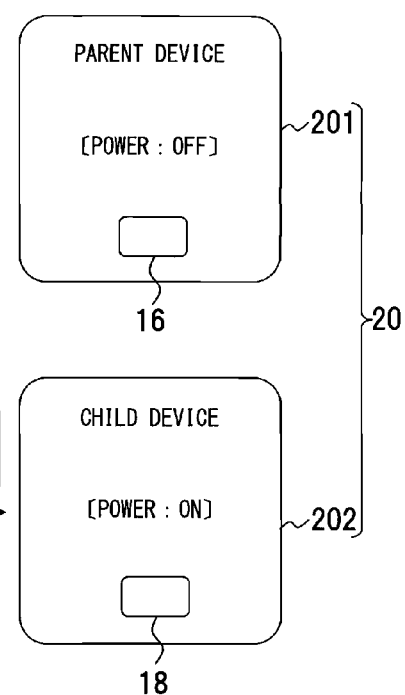
FIG.5A
FIG.5B

FIG.20

| PIN NUMBER | FUNCTION (PARENT DEVICE) | FUNCTION (CHILD DEVICE) |
|---|---|---|
| PG1 | GND | GND |
| PG2 | COMMUNICATION BETWEEN PARENT AND CHILD DEVICES (UART_TX) | COMMUNICATION BETWEEN PARENT AND CHILD DEVICES (UART_RX) |
| PG3 | COMMUNICATION BETWEEN PARENT AND CHILD DEVICES (UART_RX) | COMMUNICATION BETWEEN PARENT AND CHILD DEVICES (UART_TX) |
| PG4 | JOINING DETECTION | GND |
| PG5 | GND | JOINING DETECTION |
| PG6 | — | — |
| PG7 | — | — |
| PG8 | POWER SUPPLY | POWER SUPPLY |

COMMUNICATION TERMINAL APPARATUS, POWER SUPPLY CONTROL METHOD, AND NON-TRANSITORY COMPUTER READABLE RECORDING MEDIUM STORING POWER SUPPLY CONTROL PROGRAM

CROSS-REFERENCE TO RELATED APPLICATIONS

This application is based upon and claims the benefit of priority of the prior Japanese Patent Application No. 2009-253512, filed on Nov. 4, 2009, the entire contents of which are incorporated herein by reference.

FIELD

The embodiments discussed herein are related to power supply control for a communication terminal apparatus separable into a parent device and a child device, such as a separate type portable telephone, and are related to a communication terminal apparatus, a power supply control method and a power supply control program that perform power supply control of the child device at the timing of joining a parent device and the child device, for example.

BACKGROUND

A separated type telephone is known that is a telephone separated into an external communication function and an operation function, which are implemented as a parent device and a child device, respectively. Since the function of the parent device and the function of the child device are independently utilized in the separated state, such a telephone is equipped with individual power supply and performs control thereof.

With regard to such power supply control, in a portable telephone separated into a telephone body and a display operating unit, it is known that a main power switch of the telephone body controls the power-on/off in conjunction with control of a power switch of the display operating unit (Japanese Laid-Open Patent Publication No. 2004-172826).

SUMMARY

According to an aspect of the embodiments, a communication terminal apparatus is separated into a first communication apparatus and a second communication apparatus, the first communication apparatus and the second communication apparatus in a separated state being wirelessly connected through direct communication. The communication terminal apparatus includes a joining detecting unit and a power supply control unit. The joining detecting unit detects joining between the first communication apparatus and the second communication apparatus. The power supply control unit performs control for conforming a power control state of the second communication apparatus to a power control state of the first communication apparatus if the first communication apparatus and the second communication apparatus are joined while the power control states are different between the first communication apparatus and the second communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Other objects, features and advantages of the present disclosure will become more apparent by reference to the accompanying drawings and embodiments.

BRIEF DESCRIPTION OF DRAWINGS

FIGS. 4A and 4B are diagrams of the power supply control of the separate type portable telephone in the separated state;

FIGS. 5A and 5B are diagrams of the power supply control of the separate type portable telephone in the separated state;

FIG. 20 is a diagram of pin assignment of contacts between the parent and child devices;

DESCRIPTION OF EMBODIMENTS

As described previously, introducing the telephone separated into a parent device and a child device is equipped with a power supply for each of the parent device and the child device. The parent and child devices are individually perform the power supply control and the functions thereof can individually be implemented.

Some functions of such a separated type telephone are considered to be executed after joining the parent device and the child device in the separated state. In this case, it is cumbersome if a user must pay attention to the energized states of the both devices and the convenience is hampered in the telephone separated into the parent device and the child device equipped with individual power supply.

When the parent device and the child device are joined, it is expected that the parent device is in the energized state or non-energized state while the child device is in the non-energized state or energized state. It is very cumbersome for a user to recognize such an energized state or non-energized state to perform the power supply control through operation of a power switch.

Preferred embodiments of the present disclosure will be explained with reference to accompanying drawings.

First Embodiment

A first embodiment may provide power supply control of a communication terminal apparatus having separated first communication apparatus (parent device) and second communication apparatus (child device) achieving a wired connection through joining or achieving a wireless connection through direct communication without mediation of a wireless base station, such as a short-range communication function. In other subsequent embodiments, the parent and child devices in the separated state are assumed to be wirelessly connected through direct communication as is the case with this embodiment. If the child device is joined to the parent device, this communication terminal apparatus may be configured to link the power supply control between the parent and child devices. If the parent device and the child device are separated, this communication terminal apparatus may be configured to control the power supply of the child device into a non-energized state from the parent device.

Figure 1:
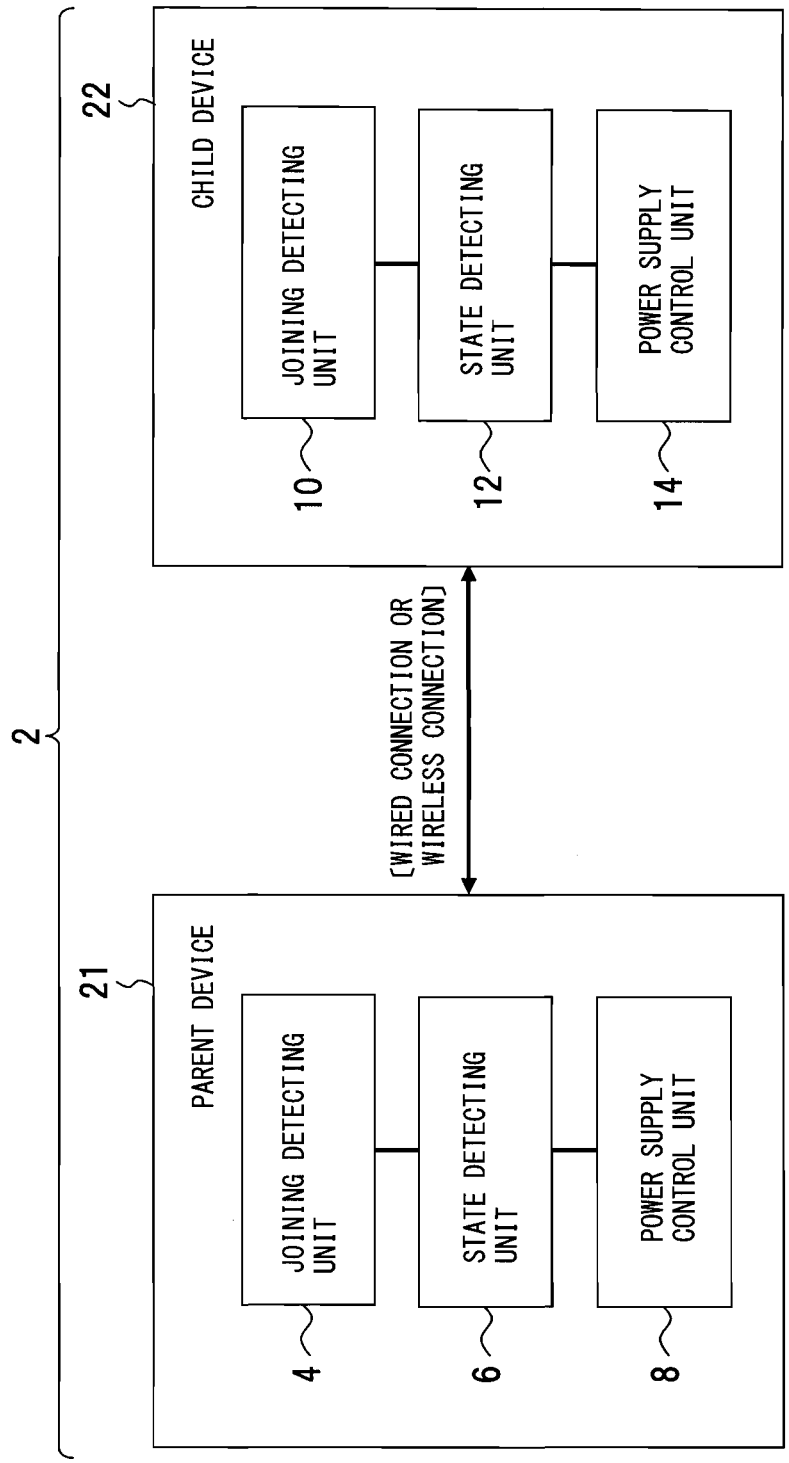
FIG. 1 is a diagram of an example of a communication terminal apparatus according to a first embodiment.

The first embodiment will be described with reference to FIG. 1. FIG. 1 depicts an example of a portable terminal apparatus. The configuration depicted in FIG. 1 is an example and the present disclosure is not limited to this configuration.

A communication terminal apparatus 2 is an example of a communication terminal apparatus of this disclosure and, as depicted in FIG. 1, a parent device 21 as a first communication apparatus and a child device 22 as a second communication apparatus are detachably separated. In the separated state, the parent device 21 and the child device 22 can achieve a wireless connection through short-range wireless communication, for example, a Bluetooth communication function. In the joined state, the parent device 21 and the child device 22 achieve a wired connection. The "wired connection" used in embodiments in this Specification means a connection in a form of physically connecting the parent device and the child device such as a terminal-to-terminal connection and the connection other than the wireless connection is referred to as a "wired connection" for convenience of description.

In this embodiment, the parent device 21 is mainly assigned with a communication function of communicating with the outside via a wireless base station or a communication network, a display function, etc., and the child device 22 is mainly assigned with a phone call function, a key operation function, etc. The parent device 21 is a wireless communicating unit while the child device 22 makes up a user interface unit and these devices are configured in a separable manner.

In this embodiment, the parent device 21 includes a joining detecting unit 4, a state detecting unit 6 and a power supply control unit 8, and the child device 22 includes a joining detecting unit 10, a state detecting unit 12 and a power supply control unit 14.

The joining detecting unit 4 is a functional unit that detects joining (e.g., a wired connection state) of the parent device 21 and the child device 22. In this case, non-joining (i.e., separation) of the parent device 21 and the child device 22 may be detected. The joining is a state of mechanically linking or coupling the parent device 21 and the child device 22 while the separation is a non-coupled state or separated state (e.g., a wireless connection state) of the parent device 21 and the child device 22 and these devices are separately used.

The state detecting unit 6 is a functional unit that detects a power control state of the parent device 21. The power control state is assumed to include three types, which are a "power-on state" while the power is turned on and functions such as phone-calling and mail transmission are usable, a "power-off state" while the power is turned off and no power is supplied to the constituent parts of the parent device 21, and a "sleep state" while the power is turned on and supplied only to a portion of the constituent parts without supplying the power to other constituent parts. The portion of the constituent parts in this case includes a constituent part for implementing a function for monitoring a joined state with the child device 22, a constituent part for implementing a function for performing direct communication with the child device 22, etc.

The power supply control unit 8 controls power feeding to the parent device 21 and the child device 22. The details of the control are as follows. First, for example, the power control state of the parent device 21 is switched. The switching is performed independently of the control of the power control state of the child device 22. Second, if the child device 22 is joined to the parent device 21, control is performed for switching the power control state of the child device 22 in conjunction with the switching of the power control state of the parent device 21. Third, if the parent device 21 and the child device 22 are separated, control is performed for switching the power control state of the child device 22 in conjunction with the switching of the power control state of the parent device 21. The power supply control of the child device 22 is performed in association with the power supply control unit 14 of the child device 22.

The joining detecting unit 10 is a functional unit that detects joining of the parent device 21 and the child device 22 as is the case with the parent device 21. In this case, non-joining (i.e., separation) of the parent device 21 and the child device 22 may be detected. The joining is a state of mechanically linking or coupling the parent device 21 and the child device 22 while the separation is a non-coupled state or separated state of the parent device 21 and the child device 22 and these devices are separately used.

The state detecting unit 12 is a functional unit that detects a power control state of the child device 22. The power control state is assumed to include three types, which are a "power-on state" while the power is turned on and functions such as character input are usable, a "power-off state" while the power is turned off and no power is supplied to the constituent parts of the child device 22, and a "sleep state" while the power is turned on and supplied only to a portion of the constituent parts without supplying the power to other constituent parts. The portion of the constituent parts in this case includes a constituent part for implementing a function for monitoring a joined state with the parent device 21, a constituent part for implementing a function for performing direct communication with the parent device 21, etc.

The power supply control unit 14 controls power feeding to the child device 22 and the parent device 21. The details of the control are as follows. First, for example, the power control state of the child device 22 is switched. The switching is performed independently of the control of the power control state of the parent device 21. Second, if the child device 22 is joined to the parent device 21, control is performed for switching the power control state of the parent device 21 in conjunction with the switching of the power control state of the child device 22. Third, if the parent device 21 and the child device 22 are separated, control is performed for switching the power control state of the child device 22 in conjunction with the switching of the power control state of the parent device 21. The power supply control of the parent device 21 is performed in association with the power supply control unit 8 of the parent device 21.

Figure 2:
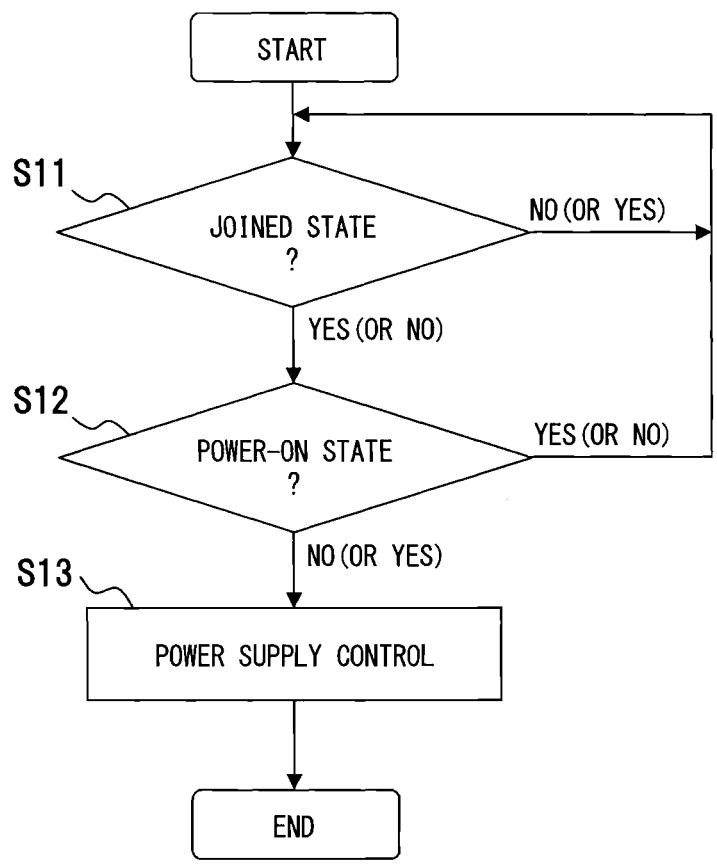
FIG. 2 is a flowchart of an example of a process procedure of power supply control.

A process procedure of the power supply control will be described with reference to FIG. 2. FIG. 2 is a flowchart of an example of a process procedure of the power supply control.

This process procedure is an example of a power supply control method or a power supply control program of this disclosure. As depicted in FIG. 2, this process procedure includes a joining detecting function (step S11), a state detecting function (step S12) and a power supply control function (step S13).

In this process procedure, as depicted in FIG. 2, it is detected whether the parent device 21 and the child device 22 are in the joined state (step S11) to determine whether the joined state or the separated state. At step S11, it may be electrically detected whether the parent device 21 and the child device 22 are in the joined state or the separated state to determine whether the joined state or the separated state based on the detection.

If the parent device 21 and the child device 22 are in the joined state (YES at step S11), it is detected whether the parent device 21 or the child device 22 are in the power-on state (step S12).

Based on the detection of the joining and the detection of the energizing state, the power supply control (step S13) can be performed. The power supply control includes the following control forms.

(1) If the parent device 21 is in the power-on state and the child device 22 is in the sleep state, the child device 22 is controlled to the power-on state at the timing of joining the child device 22 to the parent device 21.

(2) If the parent device 21 is in the sleep state and the child device 22 is in the power-on state, the child device 22 is controlled to the sleep state at the timing of joining the child device 22 to the parent device 21.

(3) If both the parent device 21 and the child device 22 are in the sleep state while the parent device 21 and the child device 22 are joined, the child device 22 is controlled to the power-on state in accordance with the switching of the parent device 21 to the power-on state. Alternatively, the parent device 21 is controlled to the power-on state in accordance with the switching of the child device 22 to the power-on state.

(4) If both the parent device 21 and the child device 22 are in the power-on state while the parent device 21 and the child device 22 are joined, the child device 22 is controlled to the sleep state in accordance with the switching of the parent device 21 to the sleep state. Alternatively, the parent device 21 is controlled to the sleep state in accordance with the switching of the child device 22 to the sleep state.

(5) If the parent device 21 and the child device 22 are in the separated state and both the parent device 21 and the child device 22 are in the power-on state, the child device 22 is controlled to the sleep state by the mediation of the wireless connection in accordance with the switching of the parent device 21 to the sleep state.

According to the power supply control, if the parent device 21 is in the power-on state or the sleep state, the child device 22 can be automatically switched to the power-on state or the sleep state depending on the parent device 21 at the timing of joining of the child device 22 to the parent device 21. While the parent device 21 and the child device 22 are joined, the control can be performed from the parent device 21 or the child device 22 to achieve the power-on state or the sleep state. If the parent device 21 and the child device 22 are in the separated state, the child device 22 can be controlled to the power-on state from the parent device 21 by the mediation of the wireless connection. In this case, if the parent device 21 and the child device 22 are in the power-on state, the control can be performed from the child device 22 to achieve the sleep state. Therefore, the convenience of power supply switching can be enhanced.

Second Embodiment

A second embodiment may provide a separate type portable telephone having a parent device and a child device in the separated state achieving a wired connection or achieving a wireless connection through a short-range communication function. This separate type portable telephone may include a configuration of controlling the child device to the power-on state or the sleep state in conjunction with the switching of the power control state of the parent device if the child device is joined to the parent device. This separate type portable telephone may include a configuration of controlling the child device in the power-on state to the sleep state from the parent device if the parent device and the child devise are separated.

Figure 3:
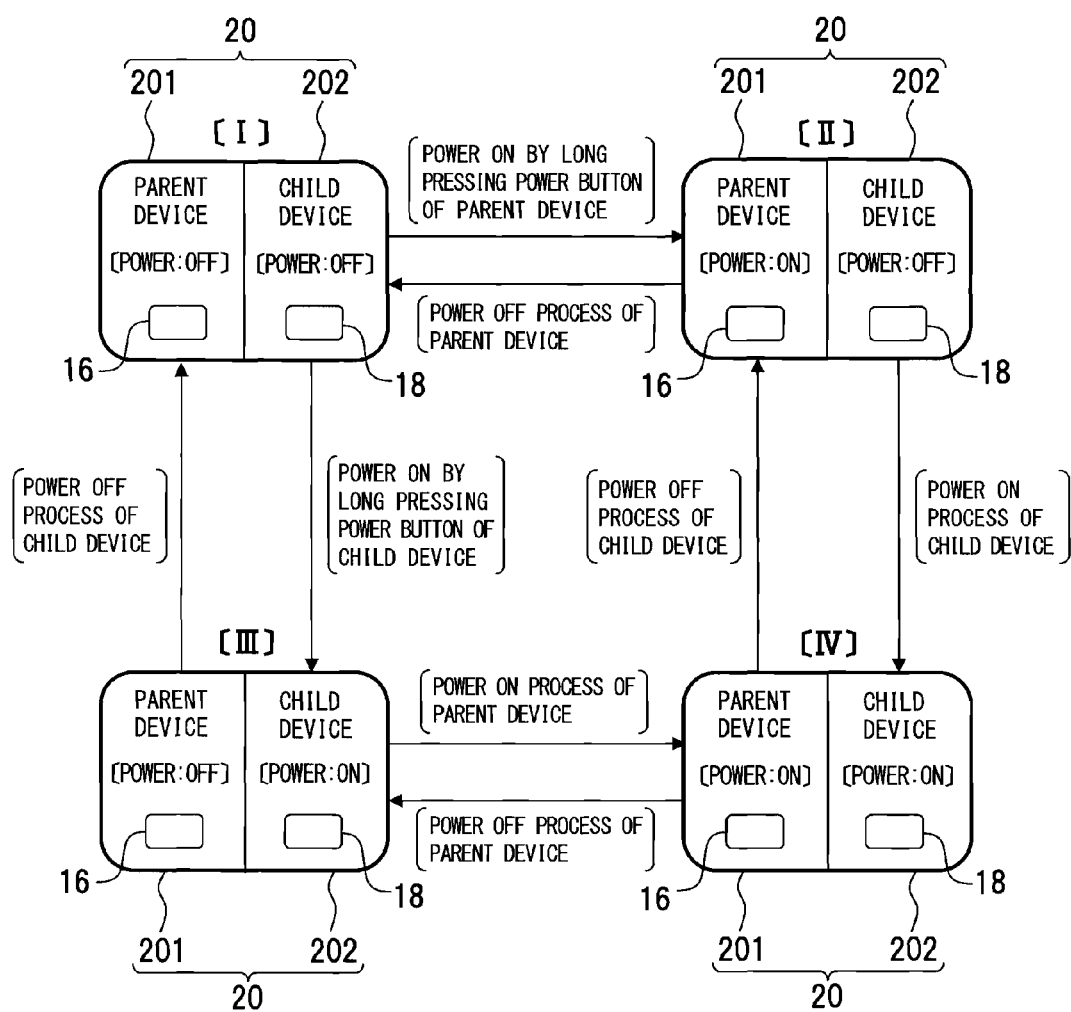
FIG. 3 is a diagram of power supply control in a joined state of a separate type portable telephone according to a second embodiment.

The second embodiment will be described with reference to FIGS. 3 to 7B. FIG. 3 depicts state transitions of the power control between the parent and child devices in the joined state and FIGS. 4A to 7B depict state transitions of the power control between the parent and child devices in the separated state.

(1) Case of Joined State

If a parent device 201 and a child device 202 are in the joined state, a state [I] or a state [IV] is achieved.

In the state [I], both the parent device 201 and the child device 202 are in the sleep state (hereinafter, "OFF state"). If a power button 16 of the parent device 201 is long pressed in the state [I], a transition occurs from the state [I] through a state [II] to the state [IV]. The power supply of the parent device 201 turns to the power-on state (hereinafter, "ON state") and, in conjunction with this ON state, the power supply of the child device 202 turns to the ON state. In this case, for the transition from the state [II] to the state [IV], the parent device 201 monitors the ON/OFF state of the child device 202 to perform the power-on control.

If a power button 18 of the child device 202 is long pressed in the state [I], a transition occurs from the state [I] through a state [III] to the state [IV]. The power supply of the child device 202 turns to the ON state and, in conjunction with this ON state, the power supply of the parent device 201 turns to the ON state. In this case, for the transition from the state [III] to the state [IV], the child device 202 monitors the ON/OFF state of the parent device 201 to perform the power-on control.

In the state [IV], both the parent device 201 and the child device 202 are in the ON state. If the power button 16 of the parent device 201 is long pressed in the state [IV], a transition occurs from the state [IV] through the state [III] to the state [I]. The power supply of the parent device 201 turns to the OFF state and, in conjunction with this OFF state, the power supply of the child device 202 turns to the OFF state. In this case, if the power-off of the parent device 201 is linked to the power-off of the child device 202, the following process is executed;

a) The parent device 201 issues to the child device 202 a power-off instruction (command) for the child device 202: and b) If the child device 202 changes in the power supply control state and is, for example, powered off, the parent device 201 is controlled to be powered off.

If the power button 18 of the child device 202 is long pressed in the state [IV], a transition occurs from the state [IV] through the state [II] to the state [IV]. The power supply of the child device 202 turns to the OFF state and, in conjunction with this OFF state, the power supply of the parent device 201 turns to the OFF state. In this case, if the power-off of the child device 202 is linked to the power-off of the parent device 201, the following process is executed;

a) The child device 202 issues to the parent device 201 a power-off instruction (command) for the parent device 201: and b) If the parent device 201 changes in the power supply and is, for example, powered off, the child device 202 is controlled to be powered off.

(2) Case of Shifting from Separate State to Joined State

If the parent device 201 and the child device 202 change from the separate state to the joined state, the power supply of the child device 202 is controlled to be turned on/off in conjunction with the ON/OFF state of the power supply of the parent device 201.

a) If the child device 202 in the OFF state is joined to the parent device 201 in the ON state, the power supply of the child device 202 is controlled to be turned on in conjunction with the power supply control state of the parent device 201. In this case, the control is performed from the state [II] to the state [IV].

b) If the child device 202 in the ON state is joined to the parent device 201 in the OFF state, the power supply of the child device 202 is controlled to be turned off in conjunction with the power supply control state of the parent device 201. In this case, the control is performed from the state [III] to the state [I].

(3) Case of Separated State

If the parent device 201 and the child device 202 are in the separated state, the wireless connection intervenes and, in a power-on operation, control is performed by operating the individual power button 16 or 18 to achieve the ON state.

If the parent device 201 and the child device 202 are in the separated state and the both are in the OFF state as depicted in FIG. 4A, the long pressing of the power button 16 of the parent device 201 turns the power supply of the parent device 201 to the ON state as depicted in FIG. 4B. In this case, the power supply control state of the child device 202 does not change.

If the parent device 201 and the child device 202 are in the separated state and the both are in the OFF state as depicted in FIG. 5A, the long pressing of the power button 18 of the child device 202 turns the power supply of the child device 202 to the ON state as depicted in FIG. 5B. In this case, the power supply control state of the parent device 201 does not change.

Figures 6A, 6B:
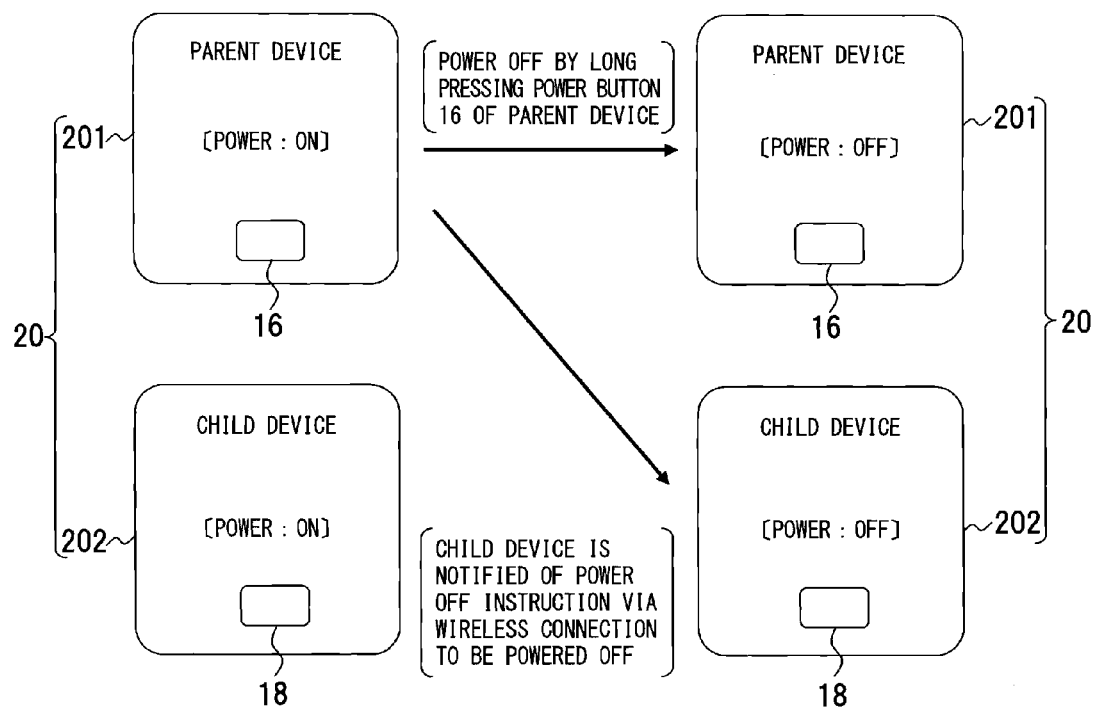
FIGS. 6A and 6B are diagrams of the power supply control of the separate type portable telephone in the separated state.

If the parent device 201 and the child device 202 are in the separated state and the both are in the ON state as depicted in FIG. 6A, the parent device 201 and the child device 202 are in the wirelessly connected state. In this case, the long pressing of the power button 16 of the parent device 201 turns the power supply of the parent device 201 to the OFF state as depicted in FIG. 6B. In this case, a power-off instruction is issued from the parent device 201 to the child device 202 through the wireless connection. In response to this OFF instruction, the power supply of the child device 202 is controlled to the OFF state.

Figure 7A:
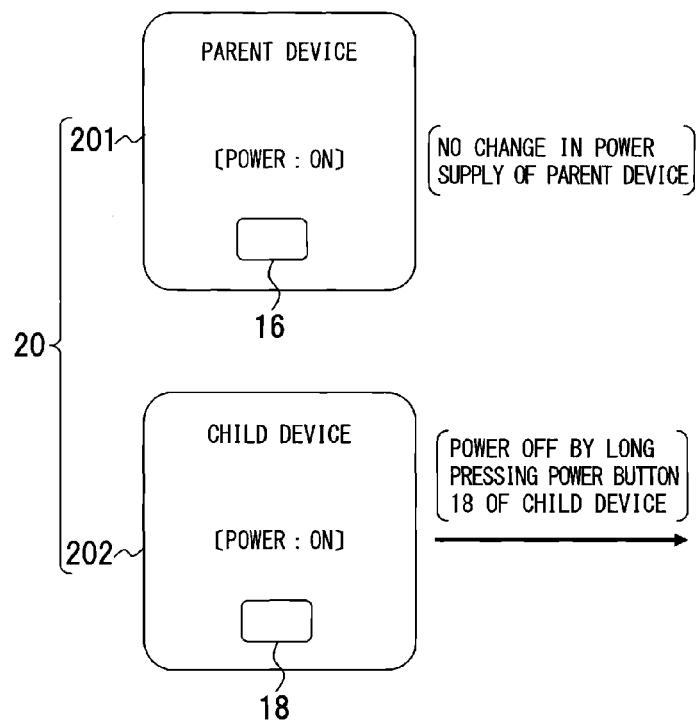
FIGS. 7A and 7B are diagrams of the power supply control of the separate type portable telephone in the separated state.
Figure 7B:
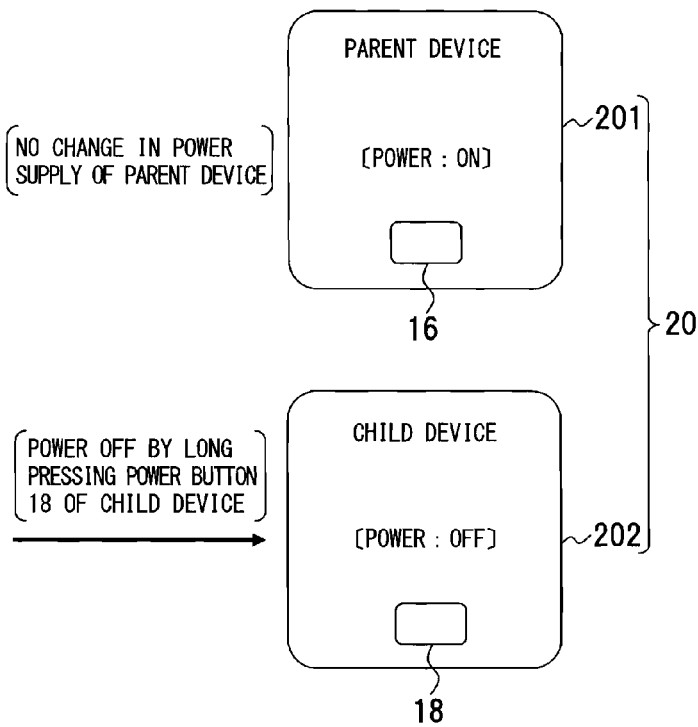

If the parent device 201 and the child device 202 are in the separated state and the both are in the ON state as depicted in FIG. 7A, the long pressing of the power button 18 of the child device 202 turns the power supply of the child device 202 to the OFF state as depicted in FIG. 7B. In this case, the power supply control state of the parent device 201 does not change.

With this configuration, the following effects are acquired.

(1) By joining the child device 202 in the sleep state to the parent device 201 in the power-on state or the sleep state, the power supply control state of the child device 202 can be switched depending on the parent device 201, thereby simplifying the power supply operations.

(2) If a user switches the parent device 201 to the power-on state to implement the function of the parent device 201 and joins the child device 202 to the parent device 201, the parent device 201 can be controlled to the power-on state to launch the function of the parent device 201 without the power supply switching operation of the child device 202 and the operation can rapidly be performed, thereby enhancing convenience.

(3) When the parent device 201 turns to the sleep state, the joining can shift the child device 202 to the sleep state without the power supply switching operation of the child device 202 even if the child device 202 is in the power-on state, thereby achieving the electric power saving. The battery consumption can be suppressed in the child device 202.

(4) Since the parent device 201 separated from the child device 202 can control the child device 202 from the power-on state to the sleep state, the power supply switching operation of the child device 202 by the user may not be necessary and the electric power saving can be achieved, thereby suppressing the battery consumption in the child device 202.

Figure 8:
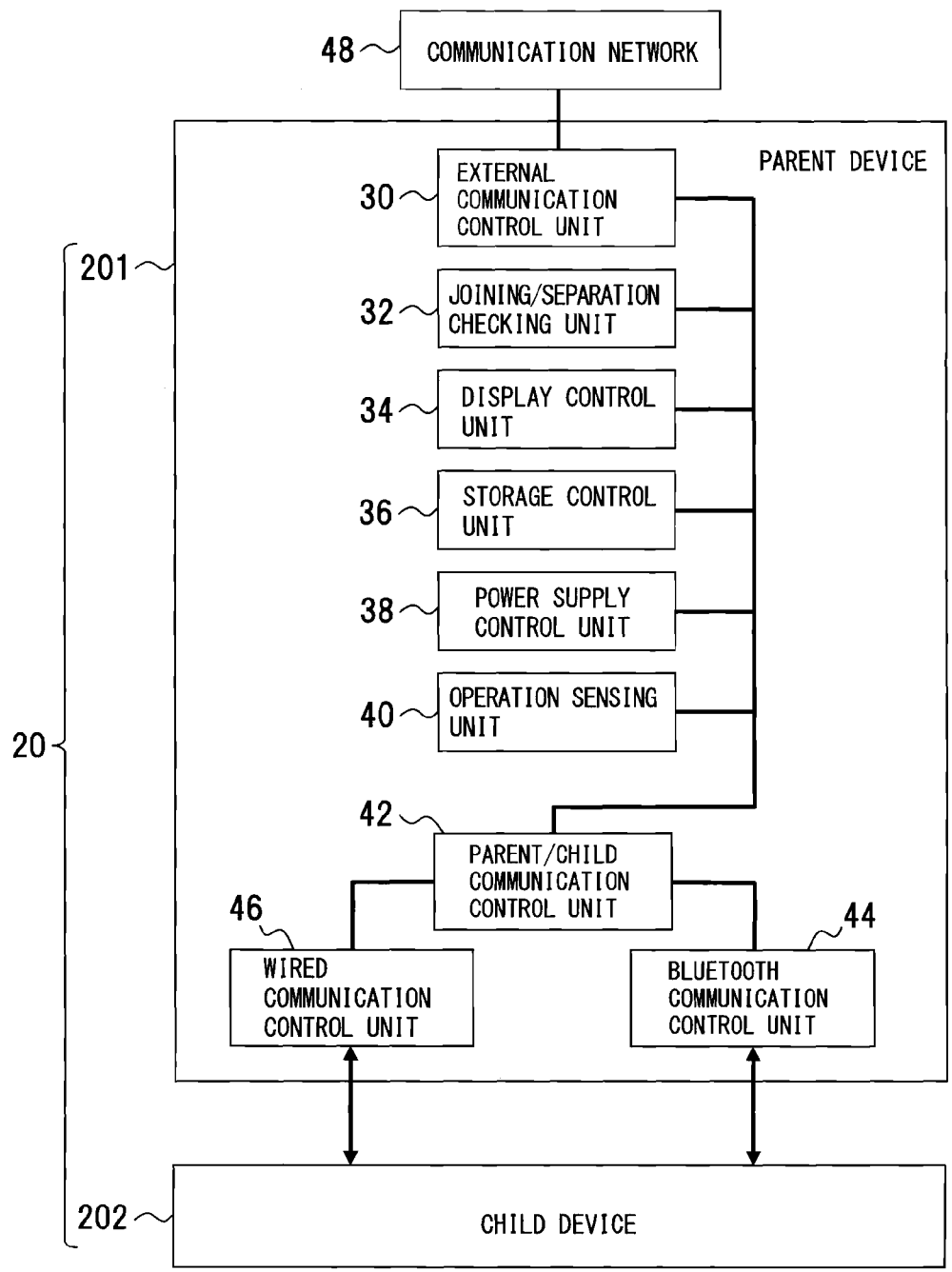
FIG. 8 is a diagram of functional units of a parent device of the separate type portable telephone.
Figure 9:
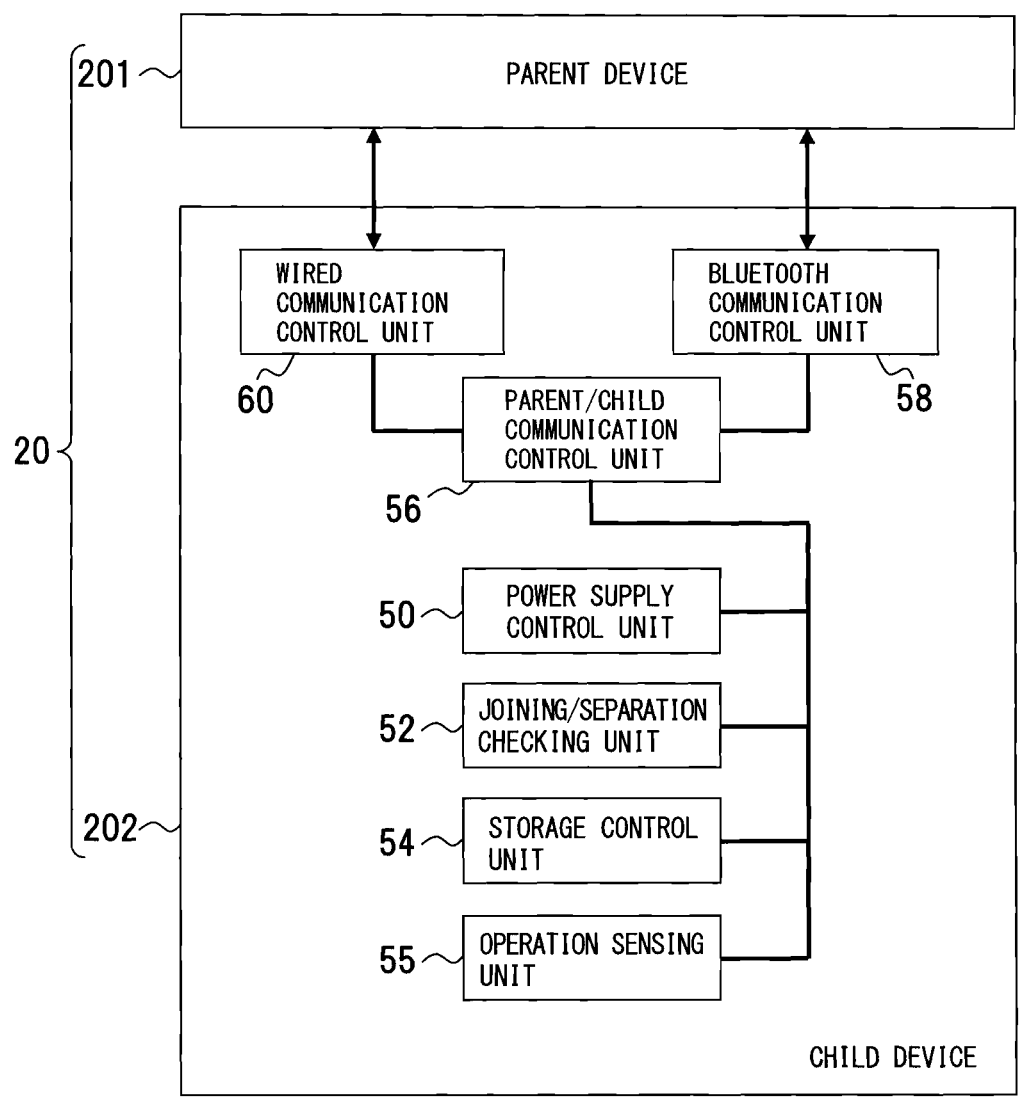
FIG. 9 is a diagram of functional units of a child device of the separate type portable telephone.

The functions of this separate type portable telephone will be described with reference to FIGS. 8 and 9. FIG. 8 depicts an example of functional units of the parent device of the separate type portable telephone and FIG. 9 depicts an example of functional units of the child device thereof.

A separate type portable telephone 20 executes an external communication function, a display function, etc., of the separate type portable telephone 20 mainly by the parent device 201 and executes a function of communicating with the parent device 201, a phone call function, etc., of the separate type portable telephone 20 mainly by the child device 202.

Therefore, as depicted in FIG. 8, the parent device 201 includes an external communication control unit 30, a joining/separation checking unit 32, a display control unit 34, a storage control unit 36, a power supply control unit 38, an operation sensing unit 40, a parent/child communication control unit 42, a Bluetooth communication control unit 44, a wired communication control unit 46 and a phone call control unit or the like as other functions. These functions are generated and executed by a computer (a processor 70, FIG. 10) mounted in the parent device 201.

The external communication control unit 30 wirelessly connects with an external communication network 48 to control phone calls and data communication. Through the communication network 48, the parent device 201 is wirelessly connected to a base station and a server.

The joining/separation checking unit 32 is a functional unit that checks whether the parent device 201 is joined to or separated from the child device 202 and corresponds to the joining detecting unit 4 described above. The determination on whether the parent device 201 is joined to or separated from the child device 202 may be performed depending on the presence of the electric coupling state between the parent device 201 and the child device 202.

Figure 10:
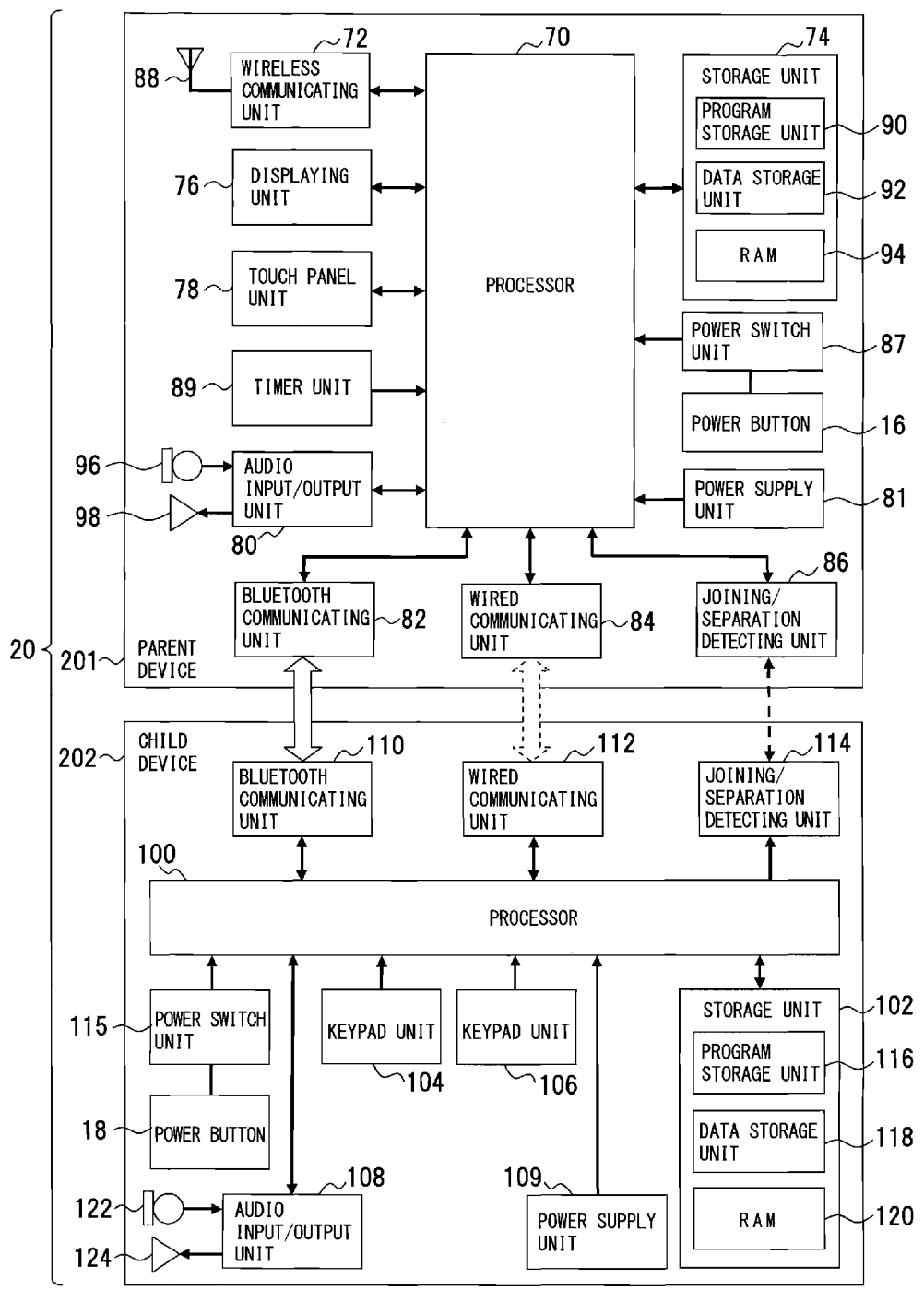
FIG. 10 is a diagram of an exemplary configuration of hardware of the separate type portable telephone.

The display control unit 34 is an example of a functional unit that controls information display and includes a function of display control for a displaying unit (FIG. 10).

The storage control unit 36 is a function of controlling retention and saving of data and is a functional unit that controls writing or reading of data in storage means. The storage control unit 36 includes control of storage, rewriting, etc., of software, power supply control information, communication control information, communication information (connection setting information), user operation information, etc., of the parent device 201.

The power supply control unit 38 is a functional unit that recognizes ON/OFF of a power switch unit 87 (FIG. 10) due to the operation of the power button 16 to control energization by the power supply to the functional units of the parent device 201. In the power supply control form, as described above, if the parent and child devices are in the joined state, the parent device 201 and the child device 202 are controlled to the ON state or the OFF state in a linked manner. If the parent and child devices are in the separated state, the power supply of the child device 202 in the ON state is controlled to the OFF state from the parent device 201. A power-on instruction or a power-off instruction is generated as a command for the power supply control of the child device 202.

The operation sensing unit 40 senses an input operation and an operation of the power button 16 and, if the power button 16 is continuously turned on or off for a predetermined time, for example, three (seconds) or more, the operation sensing unit 40 recognizes the turning on or off to generate a sensing output thereof.

The parent/child communication control unit 42 is a control functional unit that controls a communication form between the parent and child devices on the parent device 201 side and achieves the wired connection if the parent and child devices are in the joined state and the wireless connection if the parent and child devices are in the separated state. The parent/child communication control unit 42 transmits and receives the power-on instruction and the power-off instruction described above.

The Bluetooth communication control unit 44 is an example of a short-range wireless communication control unit and is a functional unit that performs wireless communication with the child device 202 for connection through a wireless medium such as a radio wave and, in this case, the Bluetooth communication may be used. The wired communication control unit 46 achieves the wired connection through the joining between the parent and child devices to perform serial communication, for example. The Bluetooth communication control unit 44 and the wired communication control unit 46 transmit and receive the power-on instruction and the power-off instruction described above.

As depicted in FIG. 9, the child device 202 includes a power supply control unit 50, a joining/separation checking unit 52, a storage control unit 54, an operation sensing unit 55, a parent/child communication control unit 56, a Bluetooth communication control unit 58 and a wired communication control unit 60, and also includes a phone call control unit. These functions are generated and executed by a computer (a processor 100, FIG. 10) mounted in the child device 202.

The power supply control unit 50 is a functional unit that recognizes ON/OFF of a power switch unit 115 (FIG. 10) to control energization by the power supply to the functional units of the child device 202. If the child device 202 is joined to the parent device 201, the energization control for the parent device 201 may be included.

The joining/separation checking unit 52 is a functional unit that checks whether the child device 202 is joined to or separated from the parent device 201 and corresponds to the joining detecting unit 10 described above. The determination on whether the child device 202 is joined to or separated from the parent device 201 may be performed depending on the presence of the electric coupling state between the parent device 201 and the child device 202 as described above.

The storage control unit 54 is an example of data retaining means and is a control functional unit that stores software provided from the parent device 201 and version number data thereof.

The operation sensing unit 55 senses an input operation and an operation of the power button 18 and, if the power button 18 is continuously turned on or off for a predetermined time, for example, three (seconds) or more, the operation sensing unit 55 recognizes the turning on or off to generate a sensing output thereof.

The parent/child communication control unit 56 is a control functional unit that controls a communication form between the parent and child devices on the child device 202 side and achieves the wired connection if the parent and child devices are in the joined state and the wireless connection if the parent and child devices are in the separated state. The parent/child communication control unit 56 transmits and receives the power-on instruction and the power-off instruction described above.

The Bluetooth communication control unit 58 is an example of a short-range wireless communication control unit and is a functional unit that controls the Bluetooth communication with the parent device 201. The wired communication control unit 60 achieves the connection through the joining between the parent and child devices as described above.

Hardware of the separate type portable telephone 20 will be described with reference to FIG. 10. FIG. 10 depicts an example of the hardware of the separate type portable telephone.

The separate type portable telephone 20 detachably includes the parent device 201 and the child device 202 and includes a hardware configuration for implementing the functions described above. As depicted in FIG. 10, the parent device 201 includes the processor 70, a wireless communicating unit 72, a storage unit 74, the displaying unit 76, a touch panel unit 78, an audio input/output unit 80, a power supply unit 81, a Bluetooth communicating unit 82, a wired communicating unit 84, a joining/separation detecting unit 86, the power switch unit 87 and a timer unit 89.

The processor 70 executes programs in the storage unit 74 to generate the functional units described above (FIG. 8) to execute the functions. The processor 70 may be made up of CPU (central processing unit), for example.

The wireless communicating unit 72 includes an antenna 88 and performs phone calls or data communication through the wireless communication with the above described communication network 48 via a base station under the control of the processor 70. The wireless communicating unit 72 is made up of a wideband code division multiple access (W-CDMA) wireless communicating unit, for example.

The storage unit 74 is storage means that stores and retains various data such as programs under the control of the processor 70 and includes a program storage unit 90, a data storage unit 92 and a RAM (random-access memory) 94. The program storage unit 90 is made up of a recording medium and stores OS (operating system), firmware programs, application programs, a power supply control program, a communication control program, etc. The data storage unit 92 is storage means for data and is made up of a nonvolatile memory that is a memory capable of retaining storage contents even if energization is canceled. The data storage unit 92 stores software etc. of the parent device 201 and the child device 202. The RAM 94 makes up a work area for executing various data processes such as communication control for the parent device 201 and the child device 202.

The displaying unit 76 is an example of a message output unit and information presenting means under the control of the processor 70 and is made up of an LCD (liquid crystal display) display, for example. The displaying unit 76 performs various displays, such as message display prompting connection with the child device 202, under the control of the processor 70.

The touch panel unit 78 is an example of input means laminated and disposed on the displaying unit 76 and is capable of giving instructions and inputting data through contact or press by a user's finger or as a stylus in accordance with display on the displaying unit 76 under the control of the processor 70.

The audio input/output unit 80 is an example of input means and output means for sound and includes a microphone 96 and a receiver 98. The audio input/output unit 80 converts sound input to the microphone 96 into an electric signal to be input to the processor 70 and reproduces an audio output signal of the processor 70 as sound with the receiver 98 under the control of the processor 70.

The power supply unit 81 is means supplied with electricity from a battery etc. to supply power to units such as the functional units of the parent device 201.

The Bluetooth communicating unit 82 is wireless connecting means that wirelessly connects with the child device 202 under the control of the processor 70 and performs the communicating connection through the Bluetooth communication, for example. The Bluetooth communicating unit 82 achieves the wireless connection if the child device 202 is separated from the parent device 201.

The wired communicating unit 84 is an example of wired connecting means that achieves the wired connection when the child device 202 is joined under the control of the processor 70 and achieves the wired connection through UART (universal asynchronous receiver transmitter) connection, for example.

The joining/separation detecting unit 86 is an example of means located on the parent device 201 side to detect whether the child device 202 is joined to the parent device 201 or the child device 202 is separated from the parent device 201 and is made up of a joining/separation detecting device, for example. The joining or separation may be detected as the presence of joining between terminals depending on electric potential, for example. In this case, if the joining/separation detecting unit 86 detects the separated state between the parent device 201 and the child device 202, the wireless connection of the Bluetooth communicating unit 82 is triggered. If the joining/separation detecting unit 86 detects the joined state between the parent device 201 and the child device 202, the wired connection of the wired communicating unit 84 is triggered. The joining/separation detecting unit 86 may be made up of a general purpose input/output port (GPIO), for example, and if the child device 202 is energized, the child device 202 may be driven to output an output signal (pulse H) representative of the joining and the power supply control state thereof and this signal may be detected.

The power switch unit 87 includes the power button 16 and is ON/OFF means for the power supply unit 81. The power switch unit 87 also is ON/OFF means for a power supply unit 109 of the child device 202 associated with the OFF control of the parent device 201 in the joined state or the separated state as described above.

The timer unit 89 is an example of timing means and is used for timing of the long pressing time of the power button 16 as described above under the control of the processor 70, for example.

The child device 202 includes the processor 100, a storage unit 102, keypad units 104 and 106, an audio input/output unit 108, the power supply unit 109, a Bluetooth communicating unit 110, a wired communicating unit 112, a joining/separation detecting unit 114 and the power switch unit 115.

The processor 100 executes programs in the storage unit 102 to generate the functional units described above (FIG. 9) to execute the functions. The processor 100 may be made up of, for example, CPU as is the case with the parent device 201.

The storage unit 102 is storage means that stores and retains various data such as programs under the control of the processor 100 and includes a program storage unit 116, a data storage unit 118 and a RAM 120. The program storage unit 116 is made up of a recording medium and stores OS, firmware programs, application programs, a power supply control program, a communication control program, etc. The data storage unit 118 is storage means for data and is made up of a nonvolatile memory that is a memory capable of retaining storage contents even if energization is canceled. The data storage unit 118 stores the version number data etc. of the software of the child device 202. The RAM 120 makes up a work area for executing various data processes such as communication control for the child device 202.

The keypad unit 104 is a first key input unit, is disposed on a main body of the child device 202, and includes symbol keys, a cursor key, a decision key, etc. The keypad unit 106 is a second key input unit, is disposed on a slide housing unit 132 (FIGS. 13 to 19) located on the child device 202 side, appears when the child device 202 is separated from the parent device 201, and is laminated on the keypad unit 104 and used for key input.

The audio input/output unit 108 is an example of input means and output means for sound and includes a microphone 122 and a receiver 124. When the child device 202 is separated from the parent device 201, the audio input/output unit 108 converts sound input to the microphone 122 into an electric signal to be input to the processor 100 and reproduces an audio output signal of the processor 100 as sound with the receiver 124 under the control of the processor 100.

The power supply unit 109 is means supplied with electricity from a battery etc. to supply power to units such as the functional units of the child device 202.

The Bluetooth communicating unit 110 is wireless connecting means that wirelessly connects with the Bluetooth communicating unit 82 of the parent device 201 under the control of the processor 100 and performs the communicating connection through the Bluetooth communication, for example. The Bluetooth communicating unit 110 achieves the wireless connection if the child device 202 is separated from the parent device 201.

The wired communicating unit 112 is wired connecting means that achieves the wired connection when the parent device 201 is joined under the control of the processor 100 and achieves the wired connection through the above described UART connection. The wired communicating unit 112 achieves the above described wired connection when joined to terminals of the parent device 201.

The joining/separation detecting unit 114 is an example of means located on the child device 202 side to detect whether the child device 202 is joined to the parent device 201 or the child device 202 is separated from the parent device 201 and is made up of a joining/separation detecting device as described above, for example. The joining or separation may be detected as the presence of joining between terminals depending on electric potential, for example. As is the case with the parent device 201, if the joining/separation detecting unit 114 detects the separated state between the parent device 201 and the child device 202, the wireless connection of the Bluetooth communicating unit 110 is triggered. If the joining/separation detecting unit 114 detects the joined state between the parent device 201 and the child device 202, the wired connection of the wired communicating unit 112 is triggered. The joining/separation detecting unit 114 may be made up of a general purpose input/output port (GPIO) as described above, for example, and if the parent device 201 is energized, the parent device 201 may be driven to output an output signal (pulse H) representative of the joining and the power supply control state thereof and this signal may be detected.

The power switch unit 115 includes the power button 18, is ON/OFF instructing means for the power supply unit 109, and also is ON/OFF instructing means for the power supply unit 81 of the parent device 201 in the joined state.

Figure 11:
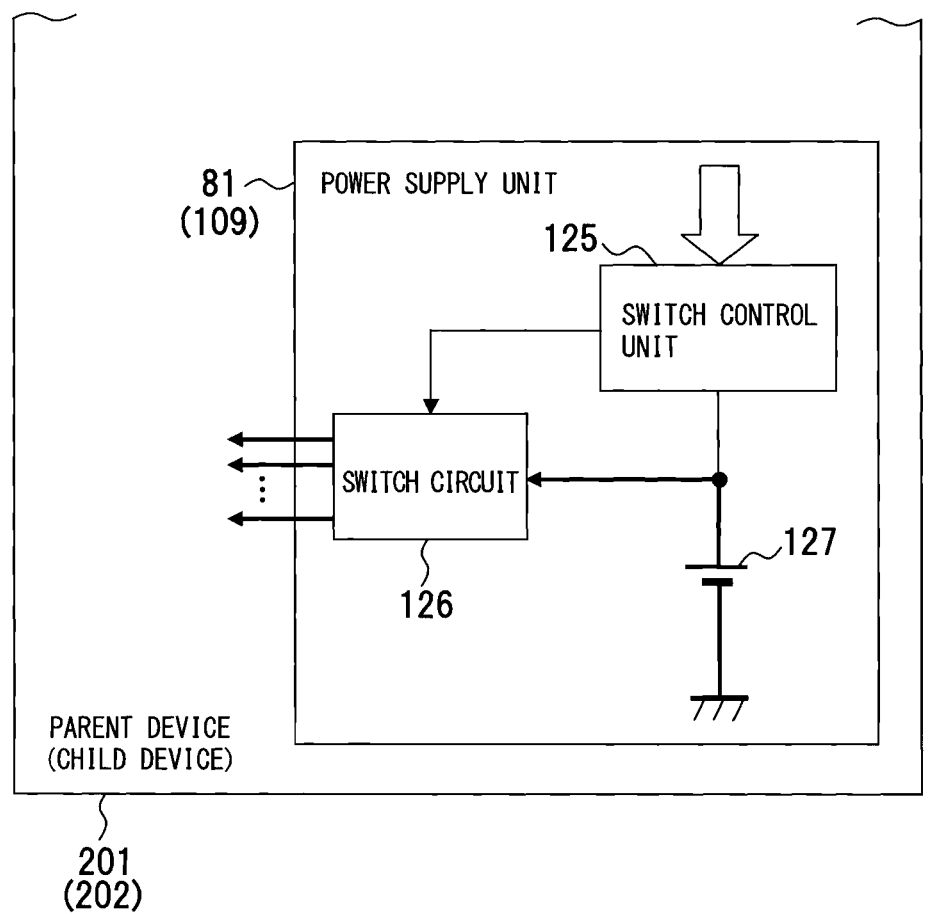
FIG. 11 is a diagram of an exemplary configuration of a power supply unit of the separate type portable telephone.

The power supply unit will be described with reference to FIG. 11. FIG. 11 depicts an example of the power supply unit.

The power supply unit 81 is an example of a power feeding device of the parent device 201 and includes a switch control unit 125, a switch circuit 126 and a buttery 127 as depicted in FIG. 11. The switch control unit 125 is always supplied with electricity from the battery 127 and is controlled by the processor 70 making up the power supply control unit 38. The switch circuit 126 is controlled by the switch control unit 125 and controls the power feeding to the functional units that perform controls other than the power-on/off control. Therefore, the power supply control can be performed even in the power-off state.

The power supply unit 109 of the child device 202 may be configured in the same way as the configuration of the power supply unit 81 and will not be described.

Figure 12:
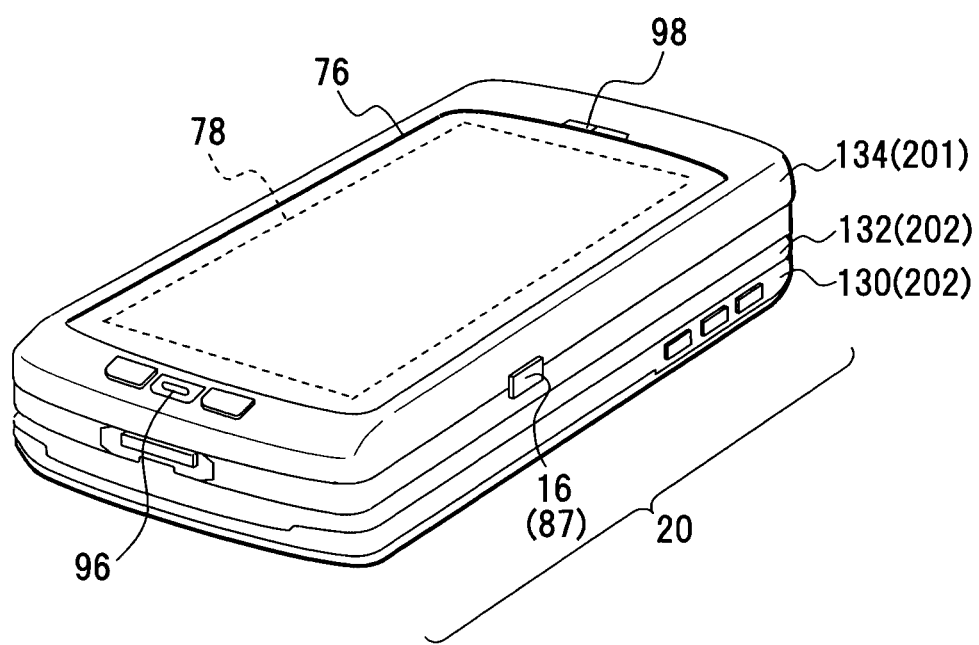
FIG. 12 is a diagram of an example of the separate type portable telephone.
Figure 13:
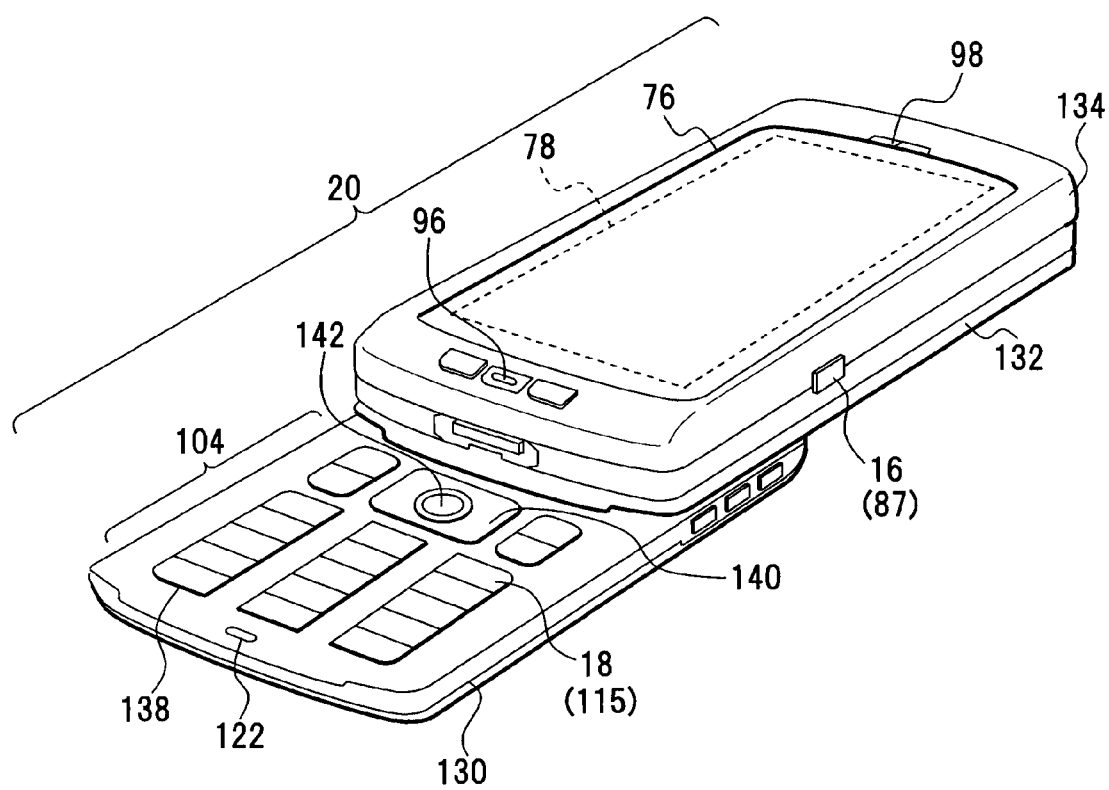
FIG. 13 is a diagram of the separate type portable telephone with the child device slid.
Figure 14:
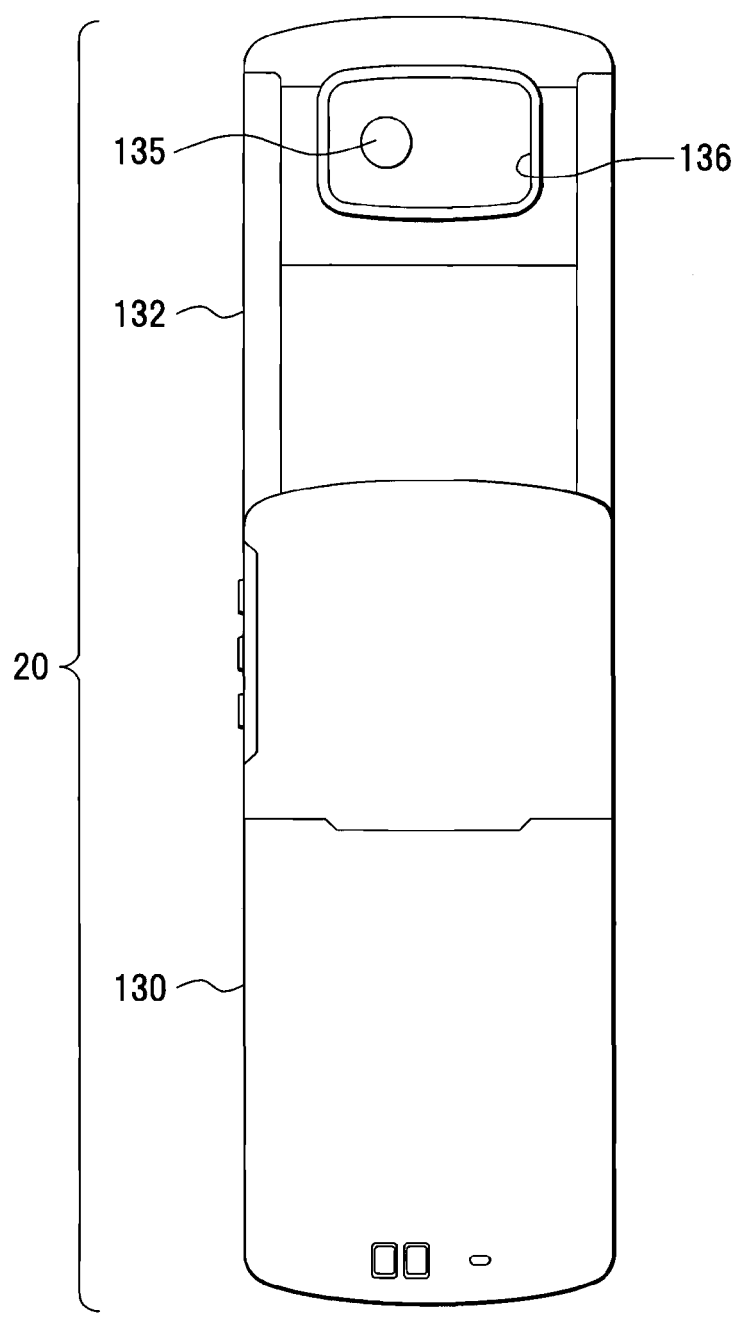
FIG. 14 is a diagram of the separate type portable telephone viewed from the rear side with the child device slid.
Figure 15:
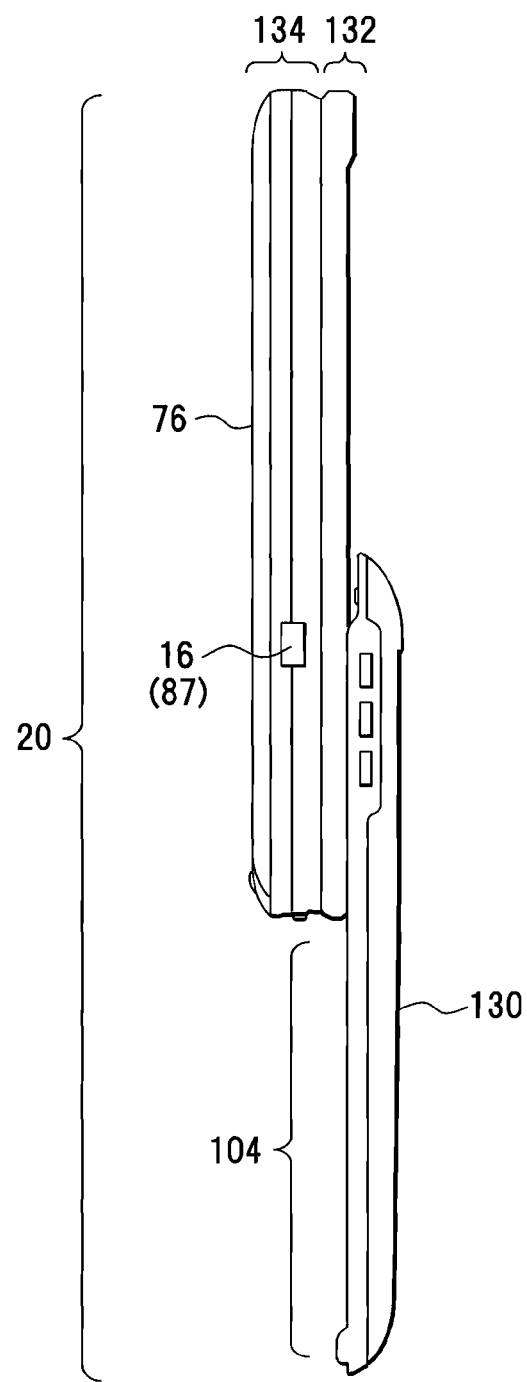
FIG. 15 is a diagram of the separate type portable telephone viewed from the lateral side with the child device slid.
Figure 16:
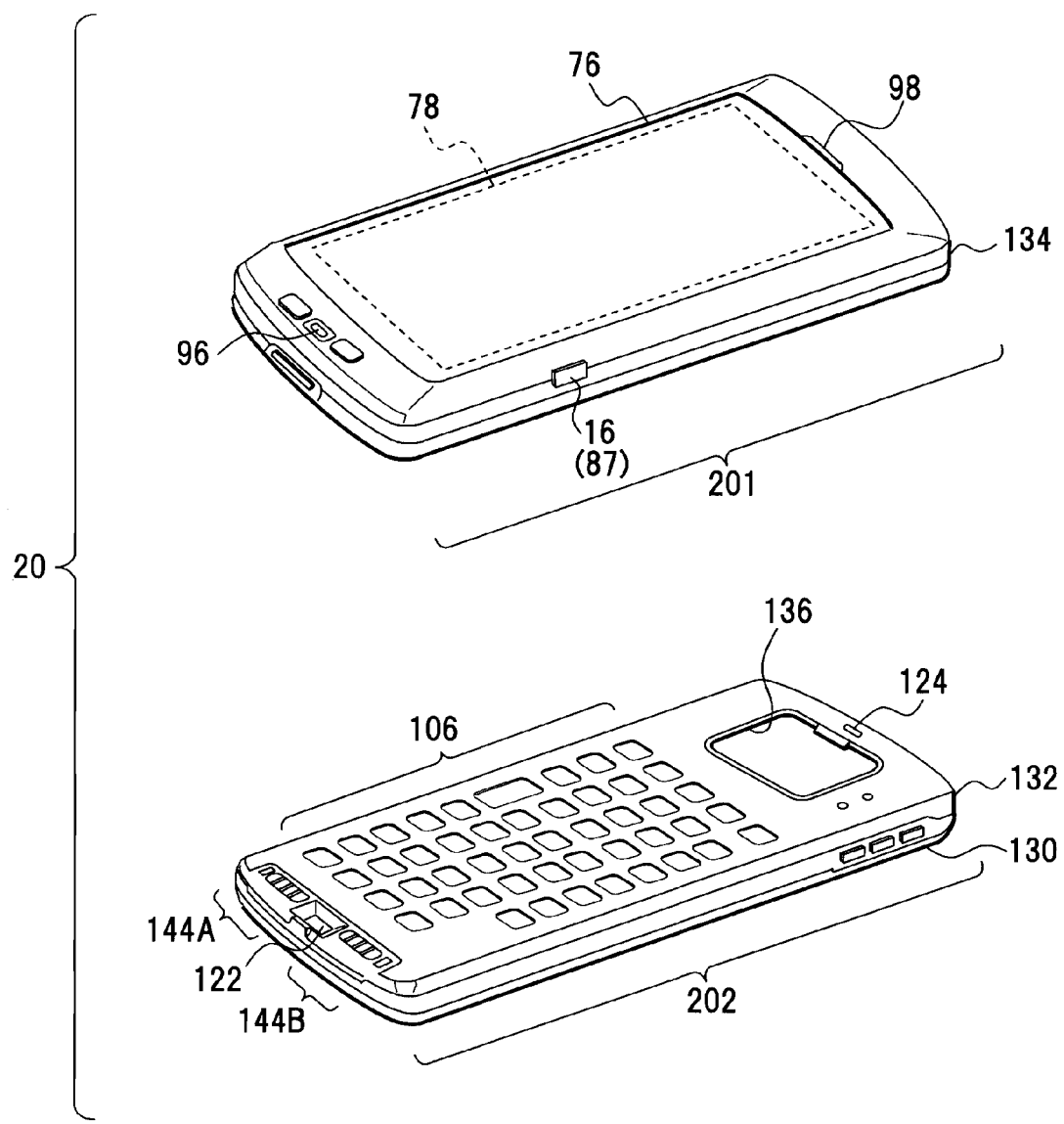
FIG. 16 is a diagram of the parent device and the child device in the separated state.
Figure 17:
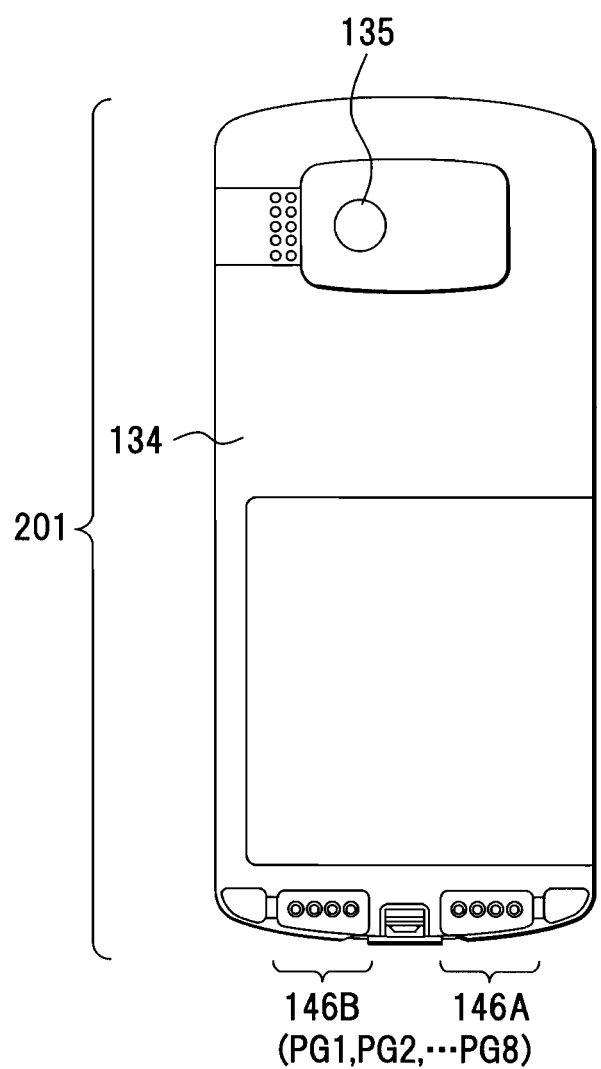
FIG. 17 is a diagram of the parent device in the separated state viewed from the rear side.
Figure 18:
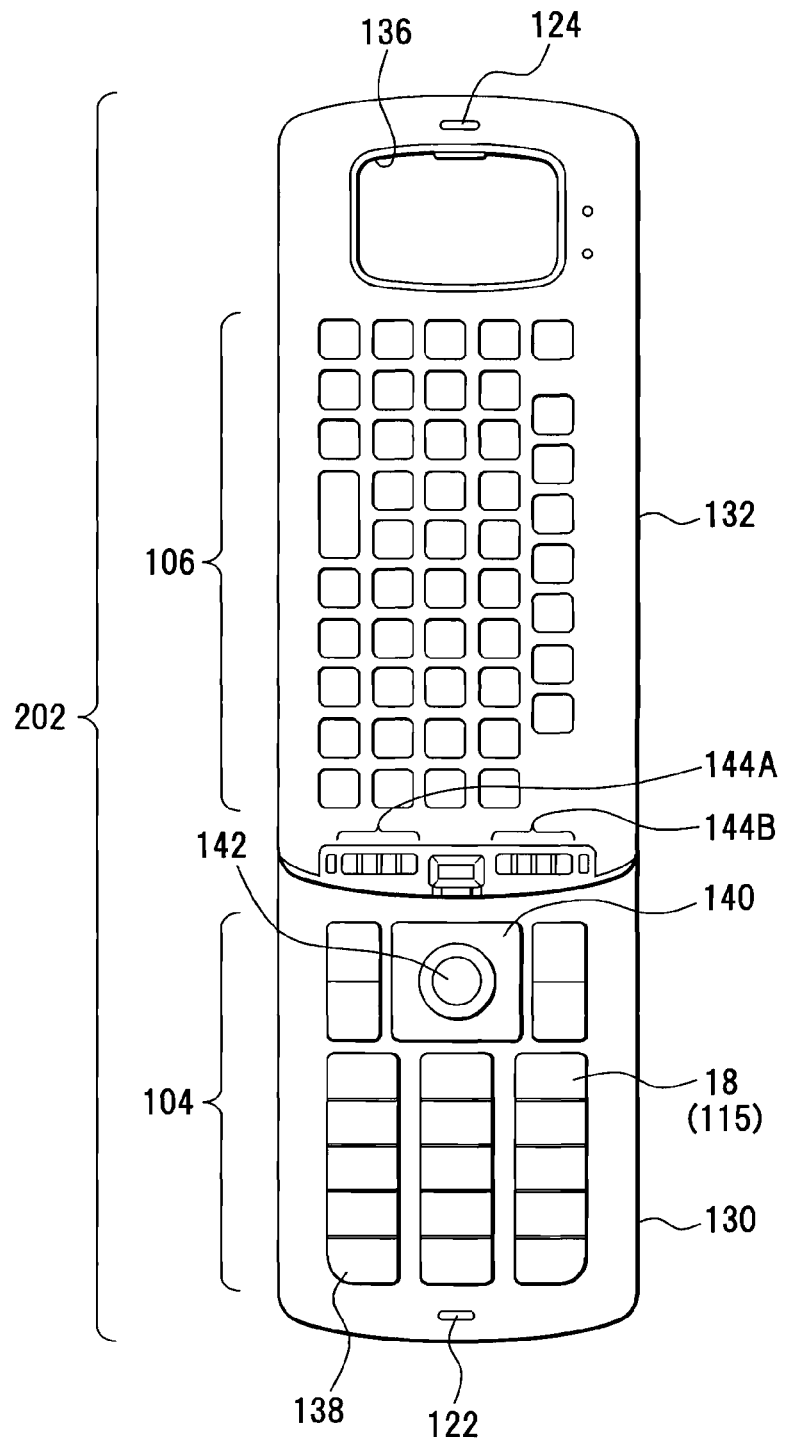
FIG. 18 is a diagram of the child device viewed from the top side with a slide housing unit of the child device slid.
Figure 19:
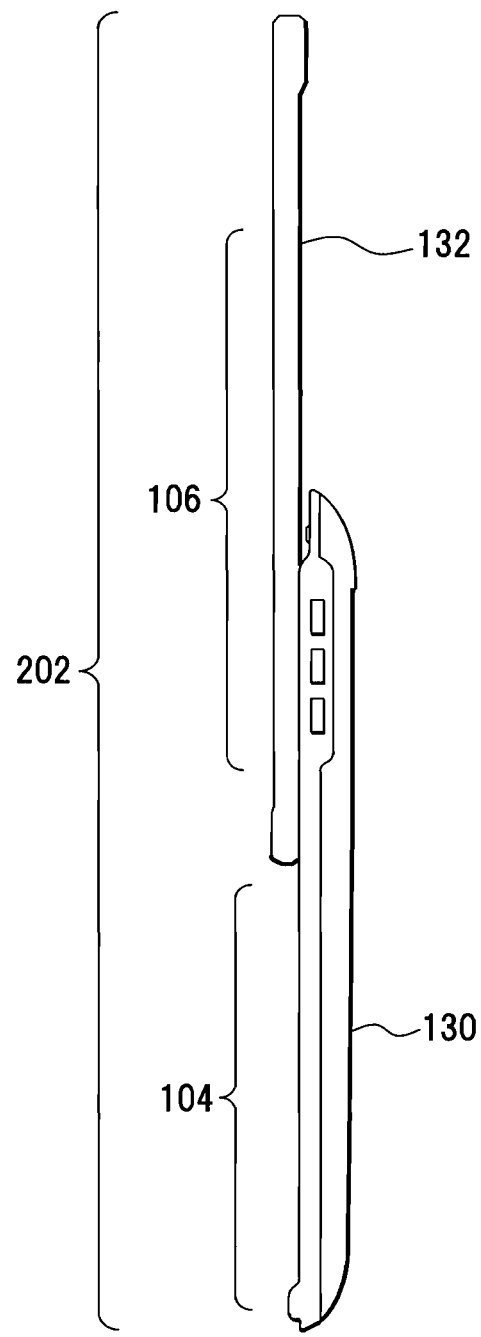
FIG. 19 is a diagram of the child device viewed from the lateral side with the slide housing unit of the child device slid.

The separate type portable telephone will be described with reference to FIGS. 12, 13, 14, 15, 16, 17, 18 and 19. FIG. 12 depicts an example of the separate type portable telephone; FIG. 13 depicts the separate type portable telephone with the child device slid; FIG. 14 depicts the separate type portable telephone viewed from the rear side with the child device slid; FIG. 15 depicts the separate type portable telephone viewed from the lateral side with the child device slid; FIG. 16 depicts the parent device and the child device in the separated state; FIG. 17 depicts the parent device in the separated state viewed from the rear side; FIG. 18 depicts the child device viewed from the top side with a slide housing unit of the child device slid; and FIG. 19 depicts the child device viewed from the lateral side with the slide housing unit of the child device slid.

As depicted in FIG. 12, the separate type portable telephone 20 includes a fixed housing unit 130, the slide housing unit 132 and a movable housing unit 134. In this case, the fixed housing unit 130 and the slide housing unit 132 are used for the child device 202 and the movable housing unit 134 is used for the parent device 201.

On the fixed housing unit 130, as depicted in FIGS. 13 to 16, the slide housing unit 132 is disposed and made slidable in the longitudinal direction of the fixed housing unit 130 by a slide mechanism. The movable housing unit 134 is attached to and detached from the slide housing unit 132 by an attaching/detaching mechanism. Therefore, if the parent device 201 is disposed in the slide housing unit 132, the parent device 201 is slidable in the longitudinal direction of the fixed housing unit 130 with the slide housing unit 132. FIGS. 13, 14 and 15 depict the movable housing unit 134 slid together with the slide housing unit 132 and projected from the fixed housing unit 130. In this case, a camera unit 135 is disposed on the rear side of the movable housing unit 134 and the camera unit 135 is exposed from a window unit 136 in the slide housing unit 132.

When the slide housing unit 132 is matched with the fixed housing unit 130, the movable housing unit 134 can be joined to or separated from the fixed housing unit 130 as depicted in FIGS. 16 and 17. FIG. 17 depicts the rear side of the movable housing unit 134. When the movable housing unit 134 (parent device 201) is separated from the fixed housing unit 130, the upper surface of the fixed housing unit 130 is covered by the slide housing unit 132 and, as depicted in FIGS. 18 and 19, the slide housing unit 132 is slidable in the longitudinal direction from the fixed housing unit 130.

With this configuration, the separate type portable telephone 20 includes the detachable and slidable parent device 201 and the child device 202 and, if the parent device 201 and the child device 202 are joined, the parent device 201 and the child device 202 are disposed on the upper surface side and the lower surface side, respectively. The movable housing unit 134 is disposed with the displaying unit 76 and the touch panel unit 78 along with the microphone 96 and the receiver 98 and the power switch unit 87 is disposed on the side surface portion.

The fixed housing unit 130 is disposed with the keypad unit 104 of the child device 202 along with the microphone 122 and the receiver 124. The slide housing unit 132 is disposed with the keypad unit 106.

In the joined state, as depicted in FIG. 13, the movable housing unit 134 slides in cooperation with the slide housing unit 132 and, if the movable housing unit 134, i.e., the parent device 201 is slid, the keypad unit 104 of the child device 202 is exposed to enable key input operations. The keypad unit 104 is disposed with symbol keys 138, a cursor key 140, a decision key 142, the power button 18 of the power switch unit 115, the microphone 122, etc.

If the movable housing unit 134 is separated from the fixed housing unit 130, the keypad unit 106 and the receiver 124 of the slide housing unit 132 are exposed on the fixed housing unit 130 as depicted in FIG. 16. The key input operation can be performed from the keypad unit 106 and a phone call can be made from the child device 202 through the mediation of the parent device 201 via the Bluetooth communication.

As depicted in FIG. 16, the fixed housing unit 130 is disposed with connection terminal units 144A and 144B of the wired communicating unit 112 and, as depicted in FIG. 17, the movable housing unit 134 is disposed with connection terminal units 146A and 146B of the wired communicating unit 84. If the parent device 201 and the child device 202 are in the joined state, since an electric connection is achieved via the connection terminal units 144A-146A and 144B-146B, the joined state is detected by the joining/separation detecting units 86 and 114. The connection terminal units 144A-146A and 144B-146B are made up of a plurality of pins PG1, PG2, PG3 . . . PG8.

Pin assignment of contacts between the parent and child devices will be described with reference to FIG. 20. FIG. 20 depicts an example of a pin assignment table of the contacts between the parent and child devices.

This pin assignment table 150 is set with a pin number field 152, a parent device function field 154 and a child device function field 156, and is stored in the data storage units 92 and 118.

In this case, the pin number field 152 stores the numbers in an eight-pin configuration of PG1, PG2, PG3 . . . PG8 as the pin numbers corresponding to the pins making up the connection terminal units 144A, 144B, 146A and 146B. In this case, the pin PG1 is assigned to the ground (GND) in both the parent device 201 and the child device 202.

The pin PG2 is assigned to the wired communication between the parent and child devices, and UART-TX representative of the transmission side and UART-RX representative of the reception side are set in the parent device 201 and the child device 202, respectively. The pin PG3 is assigned to the wired communication between the parent and child devices, and UART-RX representative of the reception side and UART-TX representative of the transmission side are set in the parent device 201 and the child device 202, respectively.

Both the pins PG4 and PG5 are assigned to the joining detection; the pin PG4 is assigned to the joining detection in the parent device 201 and the ground (GND) in the child device 202; and the PG5 is assigned to the ground (GND) in the parent device 201 and the joining detection in the child device 202.

The pins PG6 and PG7 have no assignment and PG8 is assigned to the power supply in each of the parent device 201 and the child device 202.

Figure 21:
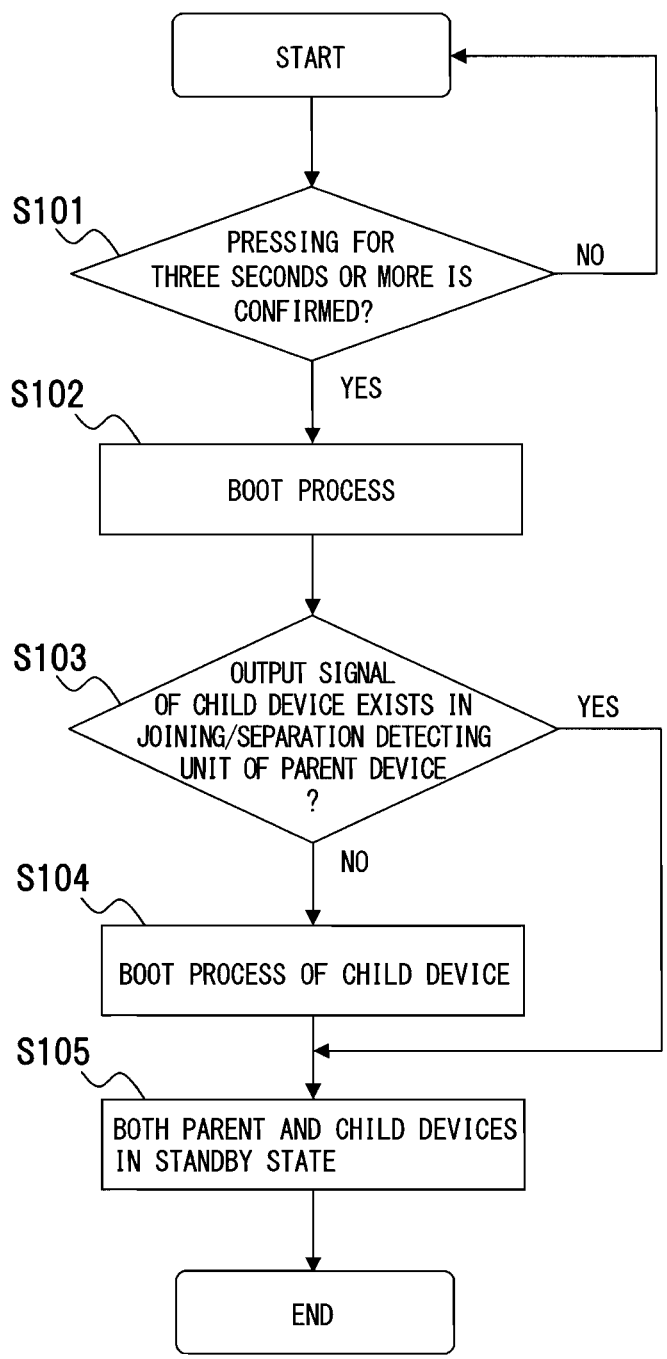
FIG. 21 is a flowchart of a process procedure of the power supply control.

The power supply control between the parent and child devices in the joined state will be described with reference to FIG. 21. FIG. 21 is a flowchart of a process procedure of the power supply control.

This process procedure is an example of a power supply control method or a power supply control program of a communication terminal apparatus and is a process procedure in accordance with a power supply operation from the parent device 201 when the parent device 201 and the child device 202 are in the joined state.

In this process procedure, as depicted in FIG. 21, the operation sensing unit 40 senses whether the power button 16 is pressed down for a predetermined time, for example, three (seconds) or more (step S101). If the power button 16 is continuously pressed down for three (seconds) or more (YES at step S101), a shift is made to a boot process (step S102). In this case, the boot process is a start-up process of the parent device 201.

It is monitored whether an output signal from the child device 202 is applied to the joining/separation detecting unit 86 of the parent device 201 during this start-up process (step S103).

If the parent device 201 does not detect the output signal from the child device 202 (NO at step S103), a boot process of the child device 202 is executed (step S104) and, after the boot process, both the parent device 201 and the child device 202 turn to a standby state (step S105).

If the parent device 201 detects the signal from the child device 202 (YES at step S103), both the parent device 201 and the child device 202 turn to the standby state (step S105) since the boot process of the child device 202 has been completed.

Figure 22:
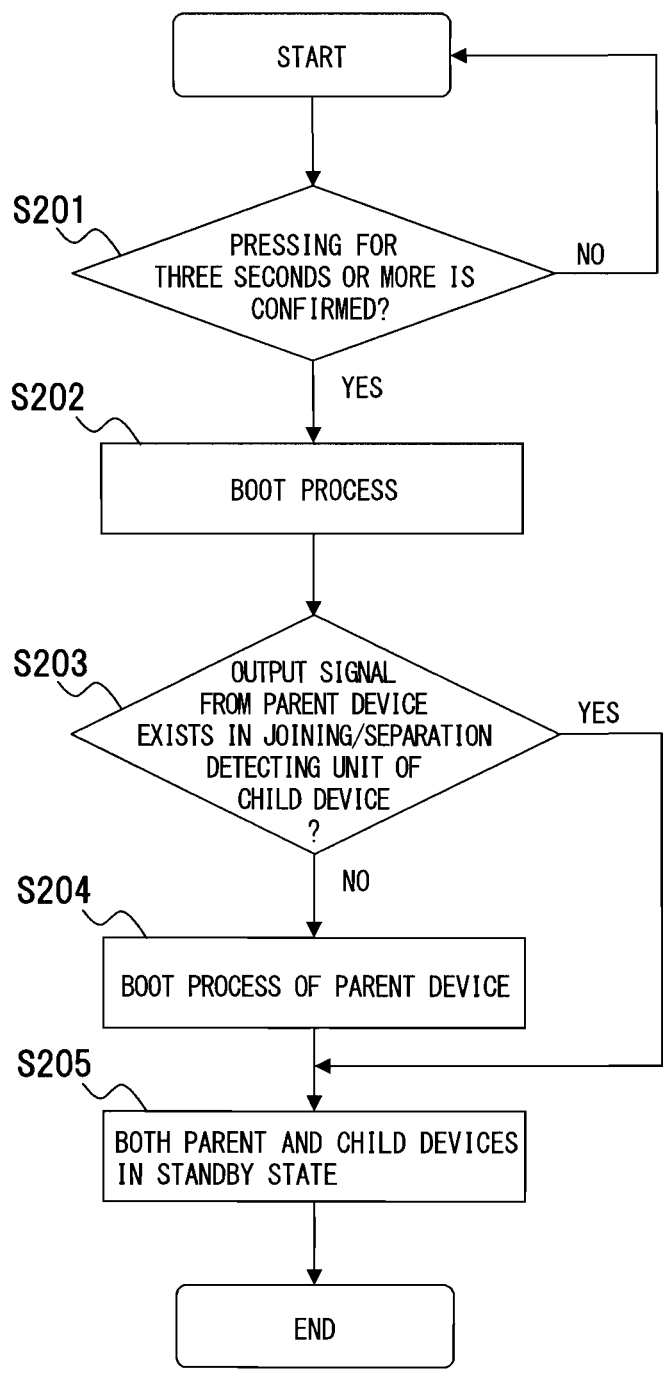
FIG. 22 is a flowchart of a process procedure of the power supply control.

The power supply control between the parent and child devices in the joined state will be described with reference to FIG. 22. FIG. 22 is a flowchart of a process procedure of the power supply control.

This process procedure is an example of a power supply control method or a power supply control program of a communication terminal apparatus and is a process procedure in accordance with a power supply operation from the child device 202 when the parent device 201 and the child device 202 are in the joined state.

In this process procedure, as depicted in FIG. 22, the operation sensing unit 55 senses whether the power button 18 is pressed down for a predetermined time, for example, three (seconds) or more (step S201). If the power button 18 is continuously pressed down for three (seconds) or more (YES at step S201), a shift is made to a boot process (step S202). In this case, the boot process is a start-up process of the child device 202.

It is monitored whether an output signal from the parent device 201 is applied to the joining/separation detecting unit 114 of the child device 202 during this start-up process (step S203).

If the child device 202 does not detect the output signal from the parent device 201 (NO at step S203), a boot process of the parent device 201 is executed (step S204) and, after the boot process, both the parent device 201 and the child device 202 turn to the standby state (step S205).

If the child device 202 detects the output signal from the parent device 201 (YES at step S203), both the parent device 201 and the child device 202 turn to the standby state (step S205) since the boot process of the parent device 201 has been completed.

Figure 23:
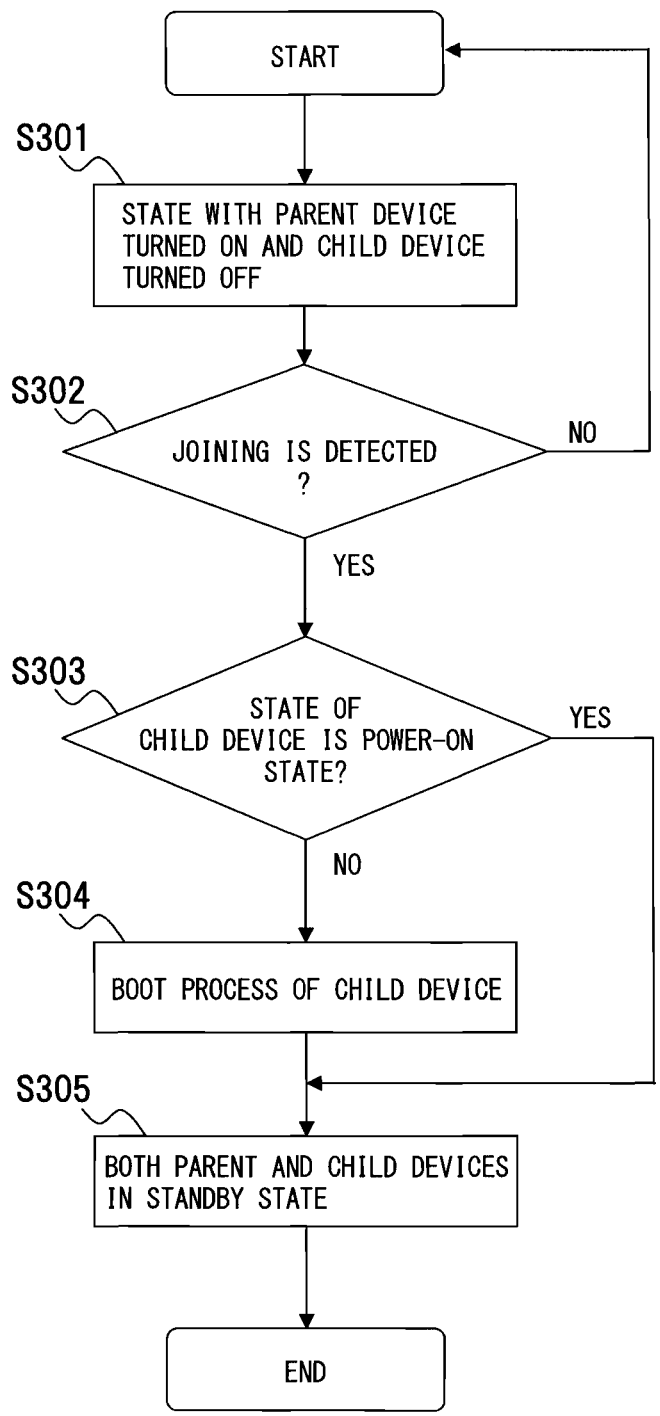
FIG. 23 is a flowchart of a process procedure of the power supply control.

The power supply control through joining will be described with reference to FIG. 23. FIG. 23 is a flowchart of a process procedure of the power supply control.

This process procedure is an example of a power supply control method or a power supply control program of a communication terminal apparatus and is a process procedure of the power supply control through the joining of the parent and child devices.

In this process procedure, as depicted in FIG. 23, the state of the parent device 201 powered on (in the power-on state) and the child device 202 powered off (in the sleep state) is detected (step S301) and detection of the joining of the parent device 201 and child device 202 is performed in this state (step S302). This detection of the joining may be performed by either or both of the joining/separation checking unit 32 of the parent device 201 and the joining/separation checking unit 52 of the child device 202.

If the parent device 201 and the child device 202 are joined (YES at step S302), it is determined whether the state of the child device 202 is the power-on state (step S303). This determination may be made by either or both of the power supply control unit 38 of the parent device 201 and the power supply control unit 50 of the child device 202.

If the power supply of the child device 202 is not in the ON state (NO at step S303), the boot process of the child device 202 is executed (step S304) and both the parent device 201 and the child device 202 shift to the power-on state (step S305) and enter the standby state.

If the power supply of the child device 202 is in the ON state (YES at step S303), since the boot process of the parent device 201 has been completed, both the parent device 201 and the child device 202 are in the power-on state (step S305) and shift to the standby state. Although the state of the power supply of the child device 202 is matched to the state of the power supply of the parent device 201 in the example described above, it is conceivable that the state of the power supply of the parent device 201 is matched to the state of the power supply of the child device 202 by contraries. In this case, a shutdown process of the parent device 201 is executed at step S304 and both the parent device 201 and the child device 202 turn to the power-off state.

Figure 24:
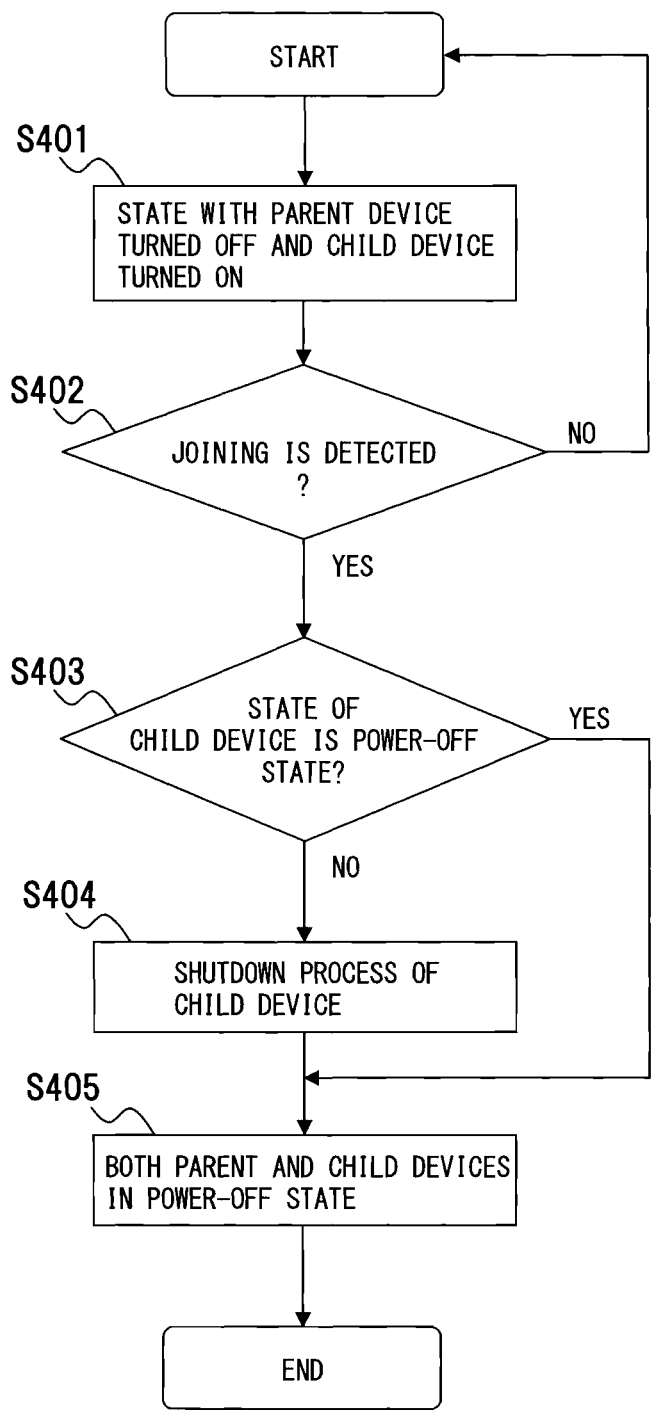
FIG. 24 is a flowchart of a process procedure of the power supply control.

The power supply control through joining will be described with reference to FIG. 24. FIG. 24 is a flowchart of a process procedure of the power supply control.

This process procedure is an example of a power supply control method or a power supply control program of a communication terminal apparatus and is a process procedure of the power supply control through the joining of the parent and child devices.

In this process procedure, as depicted in FIG. 24, the state of the parent device 201 powered off and the child device 202 powered on is detected (step S401) and detection of the joining of the parent device 201 and child device 202 is performed in this state (step S402). This detection of the joining may be performed by either or both of the joining/separation checking unit 32 of the parent device 201 and the joining/separation checking unit 52 of the child device 202.

If the parent device 201 and the child device 202 are joined (YES at step S402), it is determined whether the state of the child device 202 is the power-off state (step S403). This determination may be made by either or both of the power supply control unit 38 of the parent device 201 and the power supply control unit 50 of the child device 202.

If the power supply of the child device 202 is not in the OFF state (NO at step S403), the shutdown process of the child device 202 is executed (step S404) and both the parent device 201 and the child device 202 shift to the power-off state (step S405) and enter the standby state.

If the power supply of the child device 202 is in the OFF state (YES at step S403), since the shutdown process of the child device 202 has been completed, both the parent device 201 and the child device 202 are in the power-off state (step S405) and shift to the standby state. Although the state of the power supply of the child device 202 is matched to the state of the power supply of the parent device 201 in the example described above, it is conceivable that the state of the power supply of the parent device 201 is matched to the state of the power supply of the child device 202 by contraries. In this case, the boot process of the parent device 201 is executed at step S404 and both the parent device 201 and the child device 202 turn to the power-on state.

Figure 25:
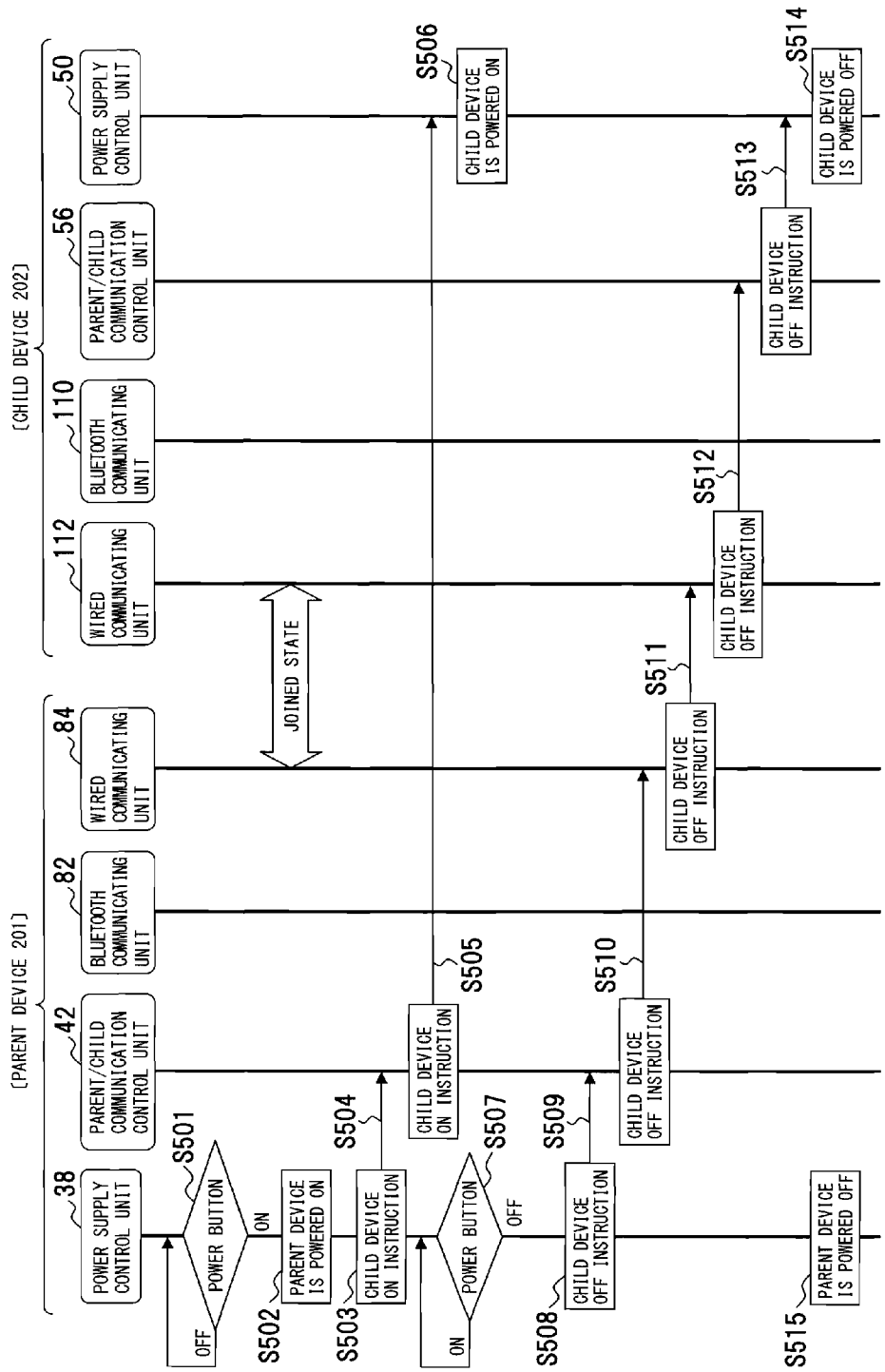
FIG. 25 is a flowchart of a process procedure of the power supply control.

The power supply control from the parent device 201 in the joined state will be described with reference to FIG. 25. FIG. 25 depicts a power-on/off sequence between the parent and child devices.

This sequence is an example of a power supply control method or a power supply control program of a communication terminal apparatus and is a sequence of performing the power supply control of the child device 202 from the power supply control of the parent device 201 in the joined state.

In this process procedure, the parent device 201 and the child device 202 are in the joined state; the joined state causes the wired communicating units 84 and 112 to be in the linked state; and the child device 202 is controlled to be powered on/off in conjunction with the powering on/off of the parent device 201.

In this process procedure, the parent device 201 monitors turning on/off of the power button 16 (step S501) and, if the power button 16 is turned on, the power supply unit 81 turns to the ON state (step S502). This ON state causes the power supply control unit 38 to generate a child device ON instruction (step S503) and the parent/child communication control unit 42 is notified of this child device ON instruction (step S504). In response to this notification, the parent/child communication control unit 42 notifies the power supply control unit 50 of the child device 202 of the child device ON instruction (step S505) and the power supply control unit 50 turns on the power supply unit 109 of the child device 202 (step S506).

If the power button 16 of the parent device 201 is turned off (step S507), the power supply control unit 38 generates a child device OFF instruction (step S508). The parent/child communication control unit 42 is notified of this child device OFF instruction (step S509) and the parent/child communication control unit 42 notifies the wired communicating unit 84 (step S510). The wired communicating unit 84 notifies the wired communicating unit 112 of the child device 202 of this child device OFF instruction (step S511) and the wired communicating unit 112 notifies the parent/child communication control unit 56 (step S512). The parent/child communication control unit 56 notifies the power supply control unit 50 of the child device OFF instruction (step S513) and the power supply control unit 50 turns off the power supply unit 109 of the child device 202 (step S514).

After generating the child device OFF instruction for the child device 202, the parent device 201 turns off the power supply of the parent device (step S515).

Figure 26:
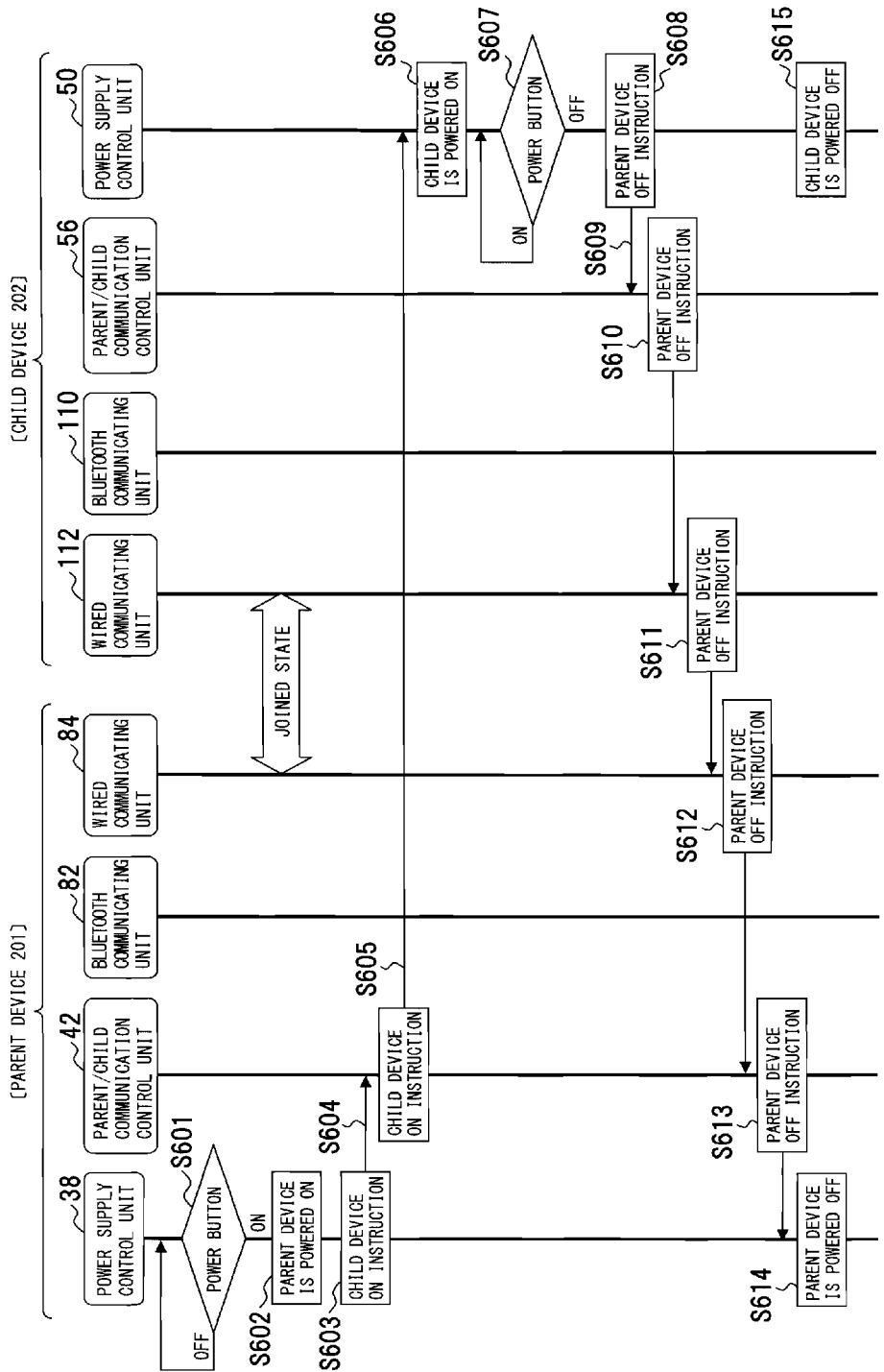
FIG. 26 is a flowchart of a process procedure of the power supply control.

The power supply control from the child device 202 in the joined state will be described with reference to FIG. 26. FIG. 26 depicts a power-on/off sequence between the parent and child devices.

This sequence is an example of a power supply control method or a power supply control program of a communication terminal apparatus and is a sequence of performing the power supply control of the child device 202 from the power supply control of the parent device 201 and the power supply control from the child device 202 to the parent device 201 in the joined state.

In this process procedure, the parent device 201 and the child device 202 are in the joined state and the process procedure includes the control of powering off the parent device 201 from the child device 202 after powering on the child device 202 from the parent device 201.

The parent device 201 monitors turning on/off of the power button 16 (step S601) and, if the power button 16 is turned on, the power supply unit 81 turns to the ON state (step S602). This shift to the ON state causes the power supply control unit 38 to generate a child device ON instruction (step S603) and the parent/child communication control unit 42 is notified of this child device ON instruction (step S604). In response to this notification, the parent/child communication control unit 42 notifies the power supply control unit 50 of the child device 202 of the child device ON instruction (step S605) and the power supply control unit 50 turns on the power supply unit 109 of the child device 202 (step S606).

If the power button 18 of the child device 202 is turned off (step S607), the turning off causes the power supply control unit 50 to generate a parent device OFF instruction (step S608); the parent/child communication control unit 56 is notified of this parent device OFF instruction (step S609); and the parent/child communication control unit 56 notifies the wired communicating unit 112 of the child device 202 (step S610). The wired communicating unit 112 notifies the wired communicating unit 84 of this parent device OFF instruction (step S611) and the wired communicating unit 84 notifies the parent/child communication control unit 42 (step S612). The parent/child communication control unit 42 notifies the power supply control unit 38 of the parent device OFF instruction (step S613) and the power supply control unit 38 turns off the power supply unit 81 of the parent device 202

(step S614). After the generation and notification of the parent device OFF instruction, the power supply control unit 50 of the child device 202 controls the power supply unit 109 of the child device 202 to the OFF state (step S615).

Figure 27:
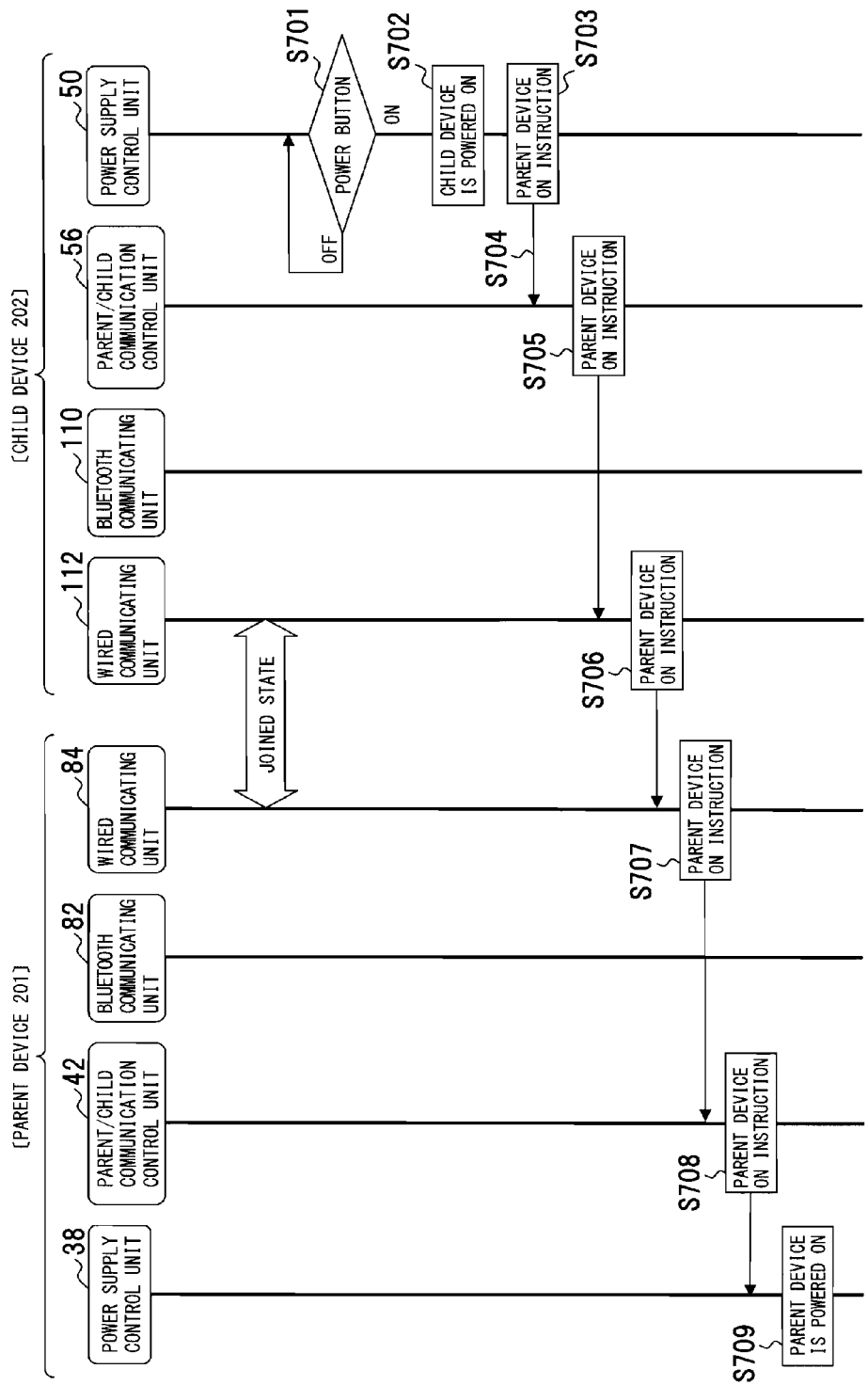
FIG. 27 is a flowchart of a process procedure of the power supply control.

The power supply control from the child device 202 in the joined state will be described with reference to FIG. 27. FIG. 27 depicts a power-on/off sequence between the parent and child devices.

This sequence is an example of a power supply control method or a power supply control program of a communication terminal apparatus and is a sequence of performing the power supply control of the child device 202 and the power supply control from the child device 202 to the parent device 201.

In this process procedure, the parent device 201 and the child device 202 are in the joined state and the process procedure includes the control of powering on the parent device 201 from the child device 202.

The child device 202 monitors turning on/off of the power button 18 (step S701) and, if the power button 18 is turned on, the power supply unit 109 is turned on (step S702). This shift to the ON state causes the power supply control unit 50 to generate a parent device ON instruction (step S703). The parent/child communication control unit 56 is notified of this parent device ON instruction (step S704); the parent/child communication control unit 56 notifies the wired communicating unit 112 (step S705); and the wired communicating unit 112 notifies the wired communicating unit 84 of the parent device 201 (step S706). The parent/child communication control unit 42 is notified of this parent device ON instruction (step S707) and the parent/child communication control unit 42 notifies the power supply control unit 38 (step S708). This parent device ON instruction causes the power supply control unit 38 to turn on the power supply unit 81 of the parent device 201 (step S709).

Figure 28:
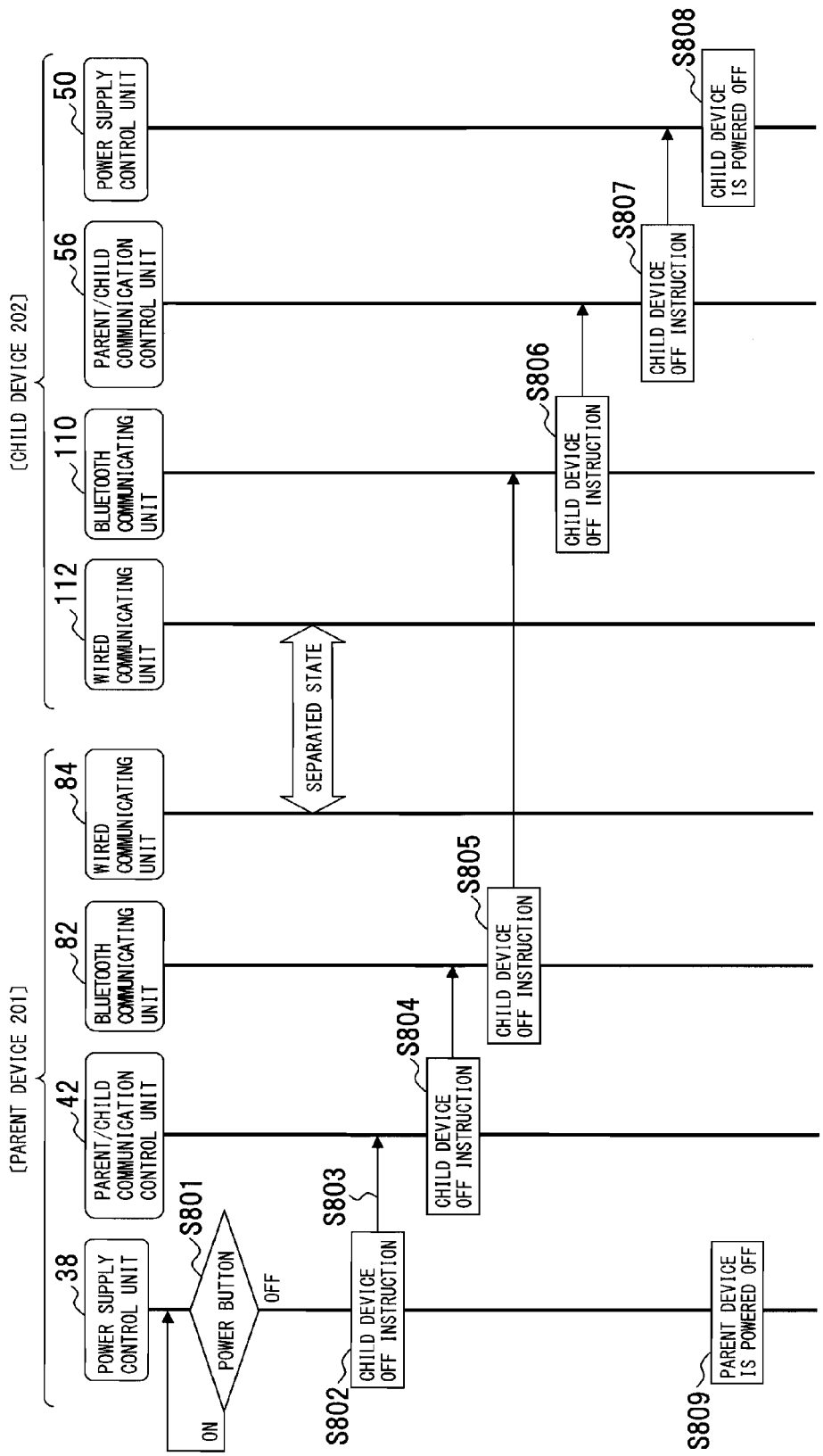
FIG. 28 is a flowchart of a process procedure of the power supply control.

The power supply control of the child device in the separated state will be described with reference to FIG. 28. FIG. 28 depicts a power-off sequence of the child device.

This sequence is an example of a power supply control method or a power supply control program of a communication terminal apparatus and is a sequence of performing the power supply control of the parent device 201 in the separated state and the power supply control for powering off the child device 202 from the parent device 201.

In this process procedure, the parent device 201 and the child device 202 are in the separated state and the process procedure includes the control of powering off the child device 202 from the parent device 201 through the mediation of the Bluetooth communication.

The parent device 201 monitors turning on/off of the power button 16 (step S801) and, if the power button 16 is turned off, the power supply control unit 38 generates a child device OFF instruction (step S802). The parent/child communication control unit 42 is notified of this child device OFF instruction (step S803); the parent/child communication control unit 42 notifies the Bluetooth communicating unit 82 (step S804); and the Bluetooth communicating unit 82 notifies the Bluetooth communicating unit 110 of the child device 202 (step S805). The parent/child communication control unit 56 is notified of this child device OFF instruction (step S806); the parent/child communication control unit 56 notifies the power supply control unit 50 (step S807); and the power supply control unit 50 turns off the power supply unit 109 of the child device 202 (step S808).

After generating the child device OFF instruction for the child device 202, the parent device 201 turns off the power supply unit 81 of the parent device (step S809).

The features and effects of the embodiments described above will be listed as follows.

(1) Since the parent and child devices are provided with their respective power supplies and the power supply of the device not in use is turned off while separated, the lives of the power supplies can be increased. Since the power supply control can be performed in the specification similar to a normal portable telephone while joined, a user can smoothly operate the devices without confusion.

(2) For the power supply control of the separate type portable telephone 20, while the parent device 201 and the child device 202 are separated, a user can freely perform the power supply control depending on usage patterns. While joined, the power supply switching operation can be simplified, contributing electric power saving.

(3) The power supply control operation can be performed while the parent device 201 and the child device 202 of the separate type portable telephone 20 are joined (UART wired communication) and separated (Bluetooth communication).

(4) Since the power supply control of the parent device 201 has priority over the child device 202 in this power supply control and the child device 202 is unable to power off the parent device 201, disadvantages are avoidable such as disrupting the operation and function of the parent device 201 due to the operation of the child device 202.

(5) The power supply control patterns described above are as follows.

a) Power-on/Off in Joined State

The power-on/off operation of the parent device 201 or the child device 202 causes a change in the power-on/off states of both of the parent and child devices. In the joined state, the power-on/off state is not differentiated between the parent device and the child device except a transitional state in the course of control.

b) Power-on/Off in Separated State

With regard to the power-on operations of the parent device 201 and the child device 202, each of the power-on operations causes a change to the power-on state. The power-off operations of the parent device 201 and the child device 202 are as follows:

parent device power-off operation: both the parent and child devices are powered off; and child device power-off operation: only the child device is powered off.

At the time of the power-off operation of the parent device 201, the child device 202 is notified of the power-off event, i.e., the off instruction via Bluetooth (SPP: Serial Port Profile) and the power supply control is performed in accordance of the notification.

c) Power-on/Off Control when Joined from Separated State

When the separated state turns to the joined state, the child device is automatically powered on/off depend on the power-on/off state of the parent device. In this case, the power-on/off state is not differentiated between the parent device 201 and the child device 202.

Other Embodiments (1) Although the above embodiments exemplarily illustrate the separate type portable telephone 20 that enables separation of the parent device 201 including a wireless communicating unit wirelessly connecting with the outside other than the child device 202 and the child device 202 equipped with a user interface unit, the present disclosure is not limited to the configuration. The child device 202 may be configured to include the wireless communicating unit.

(2) The wireless connection between the parent and child devices (communication control between parent and child devices) is performed through the short-range communication without delay on the assumption of the situation where a user needs the wireless connection and, when not needed, the use of the short-range communication can be stopped to reduce power consumption. Although the above embodiments exemplarily illustrate the Bluetooth communicating means as the short-range communication, the present disclosure is not limited to the Bluetooth communication. Other communication standards or wireless mediums may be utilized.

(3) Although the parent device 201 is equipped with the wireless communicating unit having the function of communicating with the mobile communication network and an LCD display and the child device 202 has the functional unit made up of a keypad unit having a keypad in the above embodiments, the former function and the latter function may be included in the child device 202 and the parent device 201, respectively.

(4) In the above embodiments, the short-range communication technology such as a wireless LAN function or a Bluetooth communication function is utilized to enable a phone call and an operation at the time of separation. In the Bluetooth communication, communication control modes are standardized such as HID (Human Interface Device profile) for keyboard control and HFP (Hands-Free Profile) for phone-call control. Although the Bluetooth communication has an advantage that the power consumption is less than the wireless LAN, a battery is consumed since the electric power must always be supplied to Bluetooth devices. Since a Bluetooth device is powered off if not used in the above embodiments, power consumption can be reduced and lower power consumption can further be achieved in the separate type portable telephone 20.

(5) When a Bluetooth device is used, since a time is required for activating the power supply of the device and starting communications such as HID and HFP, it takes time to actually enable the communication of the LCD unit and the keypad unit. The separated devices cannot communicate with each other unless waiting for a certain time, i.e., about three seconds immediately after separation from the joined state. Although this means that the keypad unit is not capable of phone call or key input immediately after the separation, such a problem is solved by the above embodiments.

(6) Although the above embodiments exemplarily illustrate the separate type portable telephone 20 as a communication terminal apparatus separated into a parent device and a child device, this is not a limitation. For example, a personal digital assistant (PDA) 400 (FIG. 29) or a separate type telephone 500 (FIG. 30) may be used.

Figure 29:
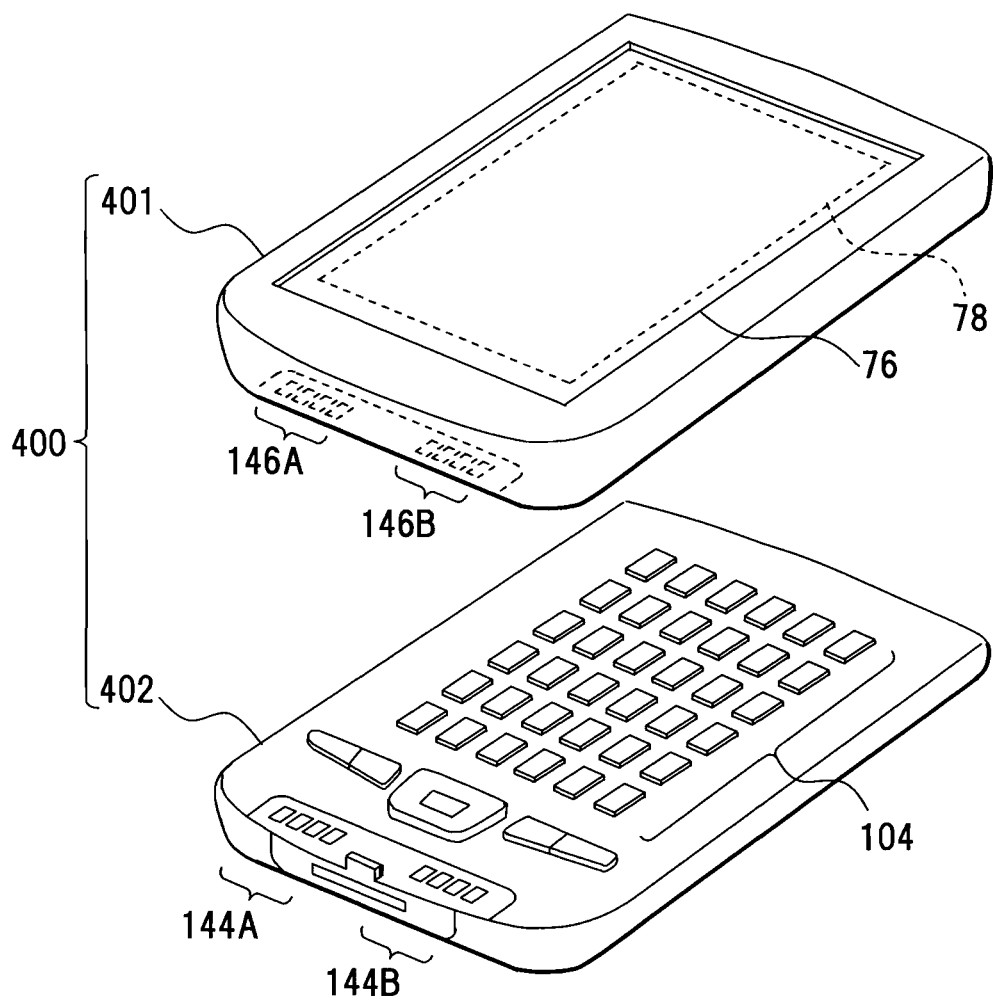
FIG. 29 is a diagram of a separate type personal digital assistant according to another embodiment.

If the PDA 400 is separated into a parent device 401 and a child device 402 as depicted in FIG. 29 and is configured as is the case with the above embodiments, the communication control function described above can be implemented. In FIG. 29, the portions same as the above embodiments are denoted by the same reference numerals and will not be described.

Figure 30:
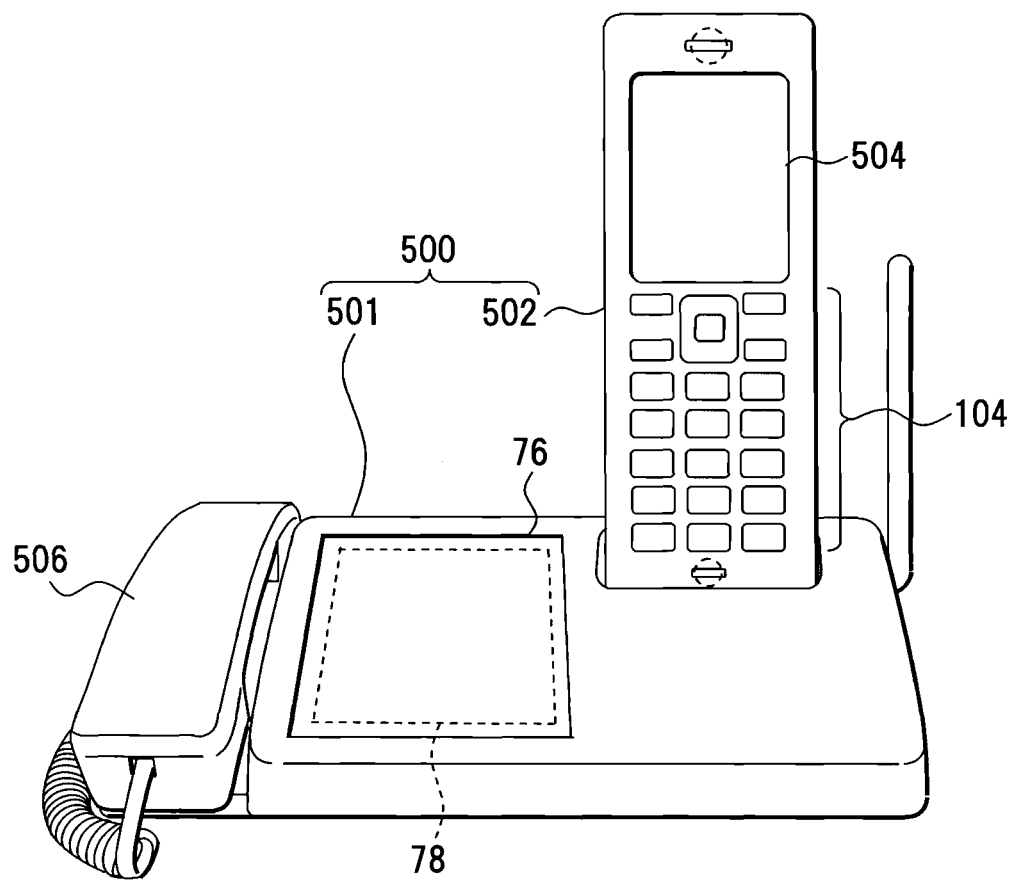
FIG. 30 is a diagram of a separate type telephone according to a further embodiment.

If the separate type telephone 500 is separated into a parent device 501 and a child device 502 as depicted in FIG. 30 and is configured as is the case with the above embodiments, the communication control function described above can be implemented. In FIG. 30, the portions same as the above embodiments are denoted by the same reference numerals and will not be described. In this example, the child device 502 includes a displaying unit 504 and the parent device 501 includes a handset 506.

The program implementing the embodiments may be recorded on computer-readable media comprising computer-readable recording media. The program implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

According to the communication terminal apparatus, the power supply control method or the power supply control program of this disclosure, the following effects are acquired.

(1) When the child device is joined to the parent device, the switching of the power control state of the parent device and the child device can be controlled in a linked manner and the switching operation of the power control state can be simplified.

(2) Since the switching of the power control state of the child device is linked with the parent device, the switching of the power control state of the child device can be skipped to achieve electric power saving and to suppress consumption of a battery of the child device.

The communication terminal apparatus, the power supply control method or the power supply control program of this disclosure provides the power supply control of a communication terminal apparatus separable into a parent device and a child device, such as a separate type portable telephone, and the power supply control is differentiated between when the parent and child devises are joined and when separated to achieve simplification of the power supply operation and the electric power saving by the control such as linking the power supply control state of the child device with the parent device if the child device is joined to the parent device in the energized state or non-energized state.

What is claimed is:

1. A communication terminal apparatus separated into a first communication apparatus and a second communication apparatus, the first communication apparatus and the second communication apparatus in a separated state being wirelessly connected through direct communication, the communication terminal apparatus comprising:

a joining detecting unit that detects joining between the first communication apparatus and the second communication apparatus; and a power supply control unit that performs control for conforming a power control state of the second communication apparatus, which is a power-on state where a power is turned on or a sleep state where the power is supplied only to a portion of constituent parts, to a power control state of the first communication apparatus, which is the power-on state or the sleep state, when the first communication apparatus and the second communication apparatus shift from the separated state to a joined state while the power control state of the second communication apparatus is different from the power control state of the first communication apparatus, and performs control for turning the power control state of the second communication apparatus to the sleep state, when the first communication apparatus and the second communication apparatus shift from the separated state to the joined state while the power control state of the first communication apparatus is the sleep state and the power control state of the second communication apparatus is the power-on state.

2. A power supply control method performed by a communication terminal apparatus separated into a first communication apparatus and a second communication apparatus, the first communication apparatus and the second communication apparatus in a separated state being wirelessly connected through direct communication, the method comprising:

detecting joining between the first communication apparatus and the second communication apparatus;

performing control for conforming a power control state of the second communication apparatus, which is a power-on state where a power is turned on or a sleep state where the power is supplied only to a portion of constituent parts, to a power control state of the first communication apparatus, which is the power-on state or the sleep state, when the first communication apparatus and the second communication apparatus shift from the separated state to a joined state while the power control state of the second communication apparatus is different from the power control state of the first communication apparatus; and performing control for turning the power control state of the second communication apparatus to the sleep state when the first communication apparatus and the second communication apparatus shift from the separated state to the joined state while the power control state of the first communication apparatus is the sleep state and the power control state of the second communication apparatus is the power-on state.

3. A non-transitory computer readable recording medium storing a power supply control program executed by a communication terminal apparatus separated into a first communication apparatus and a second communication apparatus, the first communication apparatus and the second communication apparatus in a separated state being wirelessly connected through direct communication, execution of the program causing the communication terminal apparatus to perform a process comprising:

detecting joining between the first communication apparatus and the second communication apparatus;

performing control for conforming a power control state of the second communication apparatus, which is a power-on state where a power is turned on or a sleep state where the power is supplied only to a portion of constituent parts, to a power control state of the first communication apparatus, which is the power-on state or the sleep state, when the first communication apparatus and the second communication apparatus shift from the separated state to a joined state while the power control state of the second communication apparatus is different from the power control state of the first communication apparatus; and performing control for turning the power control state of the second communication apparatus to the sleep state when the first communication apparatus and the second communication apparatus shift from the separated state to the joined state while the power control state of the first communication apparatus is the sleep state and the power control state of the second communication apparatus is the power-on state.

\* \* \* \* \*